MULTIPLE INPUT BINARY ADDER

Filed Nov. 15, 1967 12 Sheets-Sheet 1

INVENTOR
GENUNG L. CLAPPER
BY Hanifin and Clark
ATTORNEY

FIG. 4

| FIG. 4A |
|---|
| FIG. 4B |

FIG. 4A

| | OUTPUT OF THE MIBAS | | | | | | | OUTPUT OF THE MIBCDAS | | | | | | | | | POSITION TO ENTER CORRECTION FACTOR | LOGIC STATEMENT OF CONDITIONS NECESSARY TO INITIATE A CORRECTION FACTOR |
|---|---|---|---|---|---|---|---|---|---|---|---|---|---|---|---|---|---|---|
| | | | | | | | | X 100 | X 10 | | | | X 1 | | | | | |
| | $2^6$ | $2^5$ | $2^4$ | $2^3$ | $2^2$ | $2^1$ | $2^0$ | 1 | 8 | 4 | 2 | 1 | 8 | 4 | 2 | 1 | | |
| | $OC_3$ | $OC_2$ | $OC_1$ | O(8) | O(4) | O(2) | O(1) | $OC_5$ | $OC_4$ | $OC_3$ | $OC_2$ | $OC_1$ | | | | | | |
| 2 | 0 | 0 | 0 | 0 | 0 | 1 | 0 | 0 | 0 | 0 | 0 | 0 | 0 | 0 | 1 | 0 | NONE | NONE |
| 4 | 0 | 0 | 0 | 0 | 1 | 0 | 0 | 0 | 0 | 0 | 0 | 0 | 0 | 1 | 0 | 0 | | |
| 6 | 0 | 0 | 0 | 0 | 1 | 1 | 0 | 0 | 0 | 0 | 0 | 0 | 0 | 1 | 1 | 0 | | |
| 8 | 0 | 0 | 0 | 1 | 0 | 0 | 0 | 0 | 0 | 0 | 0 | 0 | 1 | 0 | 0 | 0 | | |
| 10 | 0 | 0 | 0 | 1 | 0 | 1 | 0 | 0 | 0 | 0 | 0 | 1 | 0 | 0 | 0 | 0 | 4,2 | $\overline{OC}_3\cdot\overline{OC}_2\cdot(\overline{OC}_1\cdot 8\,[4+2]+OC_1\cdot\overline{8}\cdot\overline{4})$ |
| 12 | 0 | 0 | 0 | 1 | 1 | 0 | 0 | 0 | 0 | 0 | 0 | 1 | 0 | 0 | 1 | 0 | | |
| 14 | 0 | 0 | 0 | 1 | 1 | 1 | 0 | 0 | 0 | 0 | 0 | 1 | 0 | 1 | 0 | 0 | | |
| 16 | 0 | 0 | 1 | 0 | 0 | 0 | 0 | 0 | 0 | 0 | 0 | 1 | 0 | 1 | 1 | 0 | | |
| 18 | 0 | 0 | 1 | 0 | 0 | 1 | 0 | 0 | 0 | 0 | 0 | 1 | 1 | 0 | 0 | 0 | | |
| 20 | 0 | 0 | 1 | 0 | 1 | 0 | 0 | 0 | 0 | 0 | 1 | 0 | 0 | 0 | 0 | 0 | 8,4 | $\overline{OC}_3\cdot\overline{OC}_2\cdot OC_1\cdot(\overline{8}\cdot 4+\overline{4}\cdot 8+8\cdot 4\cdot\overline{2})$ |
| 22 | 0 | 0 | 1 | 0 | 1 | 1 | 0 | 0 | 0 | 0 | 1 | 0 | 0 | 0 | 1 | 0 | | |
| 24 | 0 | 0 | 1 | 1 | 0 | 0 | 0 | 0 | 0 | 0 | 1 | 0 | 0 | 1 | 0 | 0 | | |
| 26 | 0 | 0 | 1 | 1 | 0 | 1 | 0 | 0 | 0 | 0 | 1 | 0 | 0 | 1 | 1 | 0 | | |
| 28 | 0 | 0 | 1 | 1 | 1 | 0 | 0 | 0 | 0 | 0 | 1 | 0 | 1 | 0 | 0 | 0 | | |
| 30 | 0 | 0 | 1 | 1 | 1 | 1 | 0 | 0 | 0 | 0 | 1 | 1 | 0 | 0 | 0 | 0 | $OC_1$,2 | $\overline{OC}_3\cdot(\overline{OC}_2\cdot OC_1\cdot 8\cdot 4\cdot 2+\overline{OC}_2\cdot\overline{OC}_1\cdot\overline{8})$ |
| 32 | 0 | 1 | 0 | 0 | 0 | 0 | 0 | 0 | 0 | 0 | 1 | 1 | 0 | 0 | 1 | 0 | | |
| 34 | 0 | 1 | 0 | 0 | 0 | 1 | 0 | 0 | 0 | 0 | 1 | 1 | 0 | 1 | 0 | 0 | | |
| 36 | 0 | 1 | 0 | 0 | 1 | 0 | 0 | 0 | 0 | 0 | 1 | 1 | 0 | 1 | 1 | 0 | | |
| 38 | 0 | 1 | 0 | 0 | 1 | 1 | 0 | 0 | 0 | 0 | 1 | 1 | 1 | 0 | 0 | 0 | | |
| 40 | 0 | 1 | 0 | 1 | 0 | 0 | 0 | 0 | 0 | 1 | 0 | 0 | 0 | 0 | 0 | 0 | $OC_1$,8 | $\overline{OC}_3\,(OC_2\cdot\overline{OC}_1\cdot 8+OC_2\cdot OC_1\cdot\overline{8}\cdot\overline{4}\cdot\overline{2})$ |
| 42 | 0 | 1 | 0 | 1 | 0 | 1 | 0 | 0 | 0 | 1 | 0 | 0 | 0 | 0 | 1 | 0 | | |
| 44 | 0 | 1 | 0 | 1 | 1 | 0 | 0 | 0 | 0 | 1 | 0 | 0 | 0 | 1 | 0 | 0 | | |
| 46 | 0 | 1 | 0 | 1 | 1 | 1 | 0 | 0 | 0 | 1 | 0 | 0 | 0 | 1 | 1 | 0 | | |
| 48 | 0 | 1 | 1 | 0 | 0 | 0 | 0 | 0 | 0 | 1 | 0 | 0 | 1 | 0 | 0 | 0 | | |

| | | | | | | | | | | | | | | | | | | |
|---|---|---|---|---|---|---|---|---|---|---|---|---|---|---|---|---|---|---|
| 50 | 0 | 1 | 1 | 0 | 0 | 1 | 0 | 0 | 0 | 1 | 0 | 1 | 0 | 0 | 0 | 0 | | |
| 52 | 0 | 1 | 1 | 0 | 1 | 0 | 0 | 0 | 0 | 1 | 0 | 1 | 0 | 0 | 1 | 0 | | |
| 54 | 0 | 1 | 1 | 0 | 1 | 1 | 0 | 0 | 0 | 1 | 0 | 1 | 0 | 1 | 0 | 0 | $OC_1, 8, 4, 2$ | $\overline{OC}_3\cdot OC_2\cdot OC_1\cdot(8\cdot\bar{4}+\bar{8}\cdot 4+\bar{8}\cdot\bar{4}\cdot 2)$ |
| 56 | 0 | 1 | 1 | 1 | 0 | 0 | 0 | 0 | 0 | 1 | 0 | 1 | 0 | 1 | 1 | 0 | | |
| 58 | 0 | 1 | 1 | 1 | 0 | 1 | 0 | 0 | 0 | 1 | 0 | 1 | 1 | 0 | 0 | 0 | | |
| 60 | 0 | 1 | 1 | 1 | 1 | 0 | 0 | 0 | 0 | 1 | 1 | 0 | 0 | 0 | 0 | 0 | | |
| 62 | 0 | 1 | 1 | 1 | 1 | 1 | 0 | 0 | 0 | 1 | 1 | 0 | 0 | 0 | 1 | 0 | | |
| 64 | 1 | 0 | 0 | 0 | 0 | 0 | 0 | 0 | 0 | 1 | 1 | 0 | 0 | 1 | 0 | 0 | $OC_2, 4$ | $\overline{OC}_3\cdot OC_2\cdot OC_1\cdot 8\cdot 4+OC_3\cdot\overline{OC}_2\cdot\overline{OC}_1\cdot\bar{8}\cdot(4\cdot\bar{2}+2\cdot\bar{4}+\bar{2}\cdot\bar{4})$ |
| 66 | 1 | 0 | 0 | 0 | 0 | 1 | 0 | 0 | 0 | 1 | 1 | 0 | 0 | 1 | 1 | 0 | | |
| 68 | 1 | 0 | 0 | 0 | 1 | 0 | 0 | 0 | 0 | 1 | 1 | 0 | 1 | 0 | 0 | 0 | | |
| 70 | 1 | 0 | 0 | 0 | 1 | 1 | 0 | 0 | 0 | 1 | 1 | 1 | 0 | 0 | 0 | 0 | | |
| 72 | 1 | 0 | 0 | 1 | 0 | 0 | 0 | 0 | 0 | 1 | 1 | 1 | 0 | 0 | 1 | 0 | | |
| 74 | 1 | 0 | 0 | 1 | 0 | 1 | 0 | 0 | 0 | 1 | 1 | 1 | 0 | 1 | 0 | 1 | $OC_2, 8, 2$ | $OC_3\cdot\overline{OC}_2\cdot\overline{OC}_1\cdot(8+\bar{8}\cdot 4\cdot 2)$ |
| 76 | 1 | 0 | 0 | 1 | 1 | 0 | 0 | 0 | 0 | 1 | 1 | 1 | 0 | 1 | 1 | 0 | | |
| 78 | 1 | 0 | 0 | 1 | 1 | 1 | 0 | 0 | 0 | 1 | 1 | 1 | 1 | 0 | 0 | 0 | | |
| 80 | 1 | 0 | 1 | 0 | 0 | 0 | 0 | 0 | 1 | 0 | 0 | 0 | 0 | 0 | 0 | 0 | | |
| 82 | 1 | 0 | 1 | 0 | 0 | 1 | 0 | 0 | 1 | 0 | 0 | 0 | 0 | 0 | 1 | 0 | | |
| 84 | 1 | 0 | 1 | 0 | 1 | 0 | 0 | 0 | 1 | 0 | 0 | 0 | 0 | 1 | 0 | 0 | $OC_2, OC_1$ | $OC_3\cdot OC_2\cdot OC_1\cdot(\bar{8}+8\cdot\bar{4}\cdot\bar{2})$ |
| 86 | 1 | 0 | 1 | 0 | 1 | 1 | 0 | 0 | 1 | 0 | 0 | 0 | 0 | 1 | 1 | 0 | | |
| 88 | 1 | 0 | 1 | 1 | 0 | 0 | 0 | 0 | 1 | 0 | 0 | 0 | 1 | 0 | 0 | 0 | | |
| 90 | 1 | 0 | 1 | 1 | 0 | 1 | 0 | 0 | 1 | 0 | 0 | 1 | 0 | 0 | 0 | 0 | | |
| 92 | 1 | 0 | 1 | 1 | 1 | 0 | 0 | 0 | 1 | 0 | 0 | 1 | 0 | 0 | 1 | 0 | | |
| 94 | 1 | 0 | 1 | 1 | 1 | 1 | 0 | 0 | 1 | 0 | 0 | 1 | 0 | 1 | 0 | 0 | $OC_2, OC_1, 4, 2$ | $OC_3\cdot\overline{OC}_2\cdot OC_1\cdot 8\cdot(4+2)+OC_3\cdot OC_2\cdot\overline{OC}_1\cdot\bar{8}\cdot\bar{4}$ |
| 96 | 1 | 1 | 0 | 0 | 0 | 0 | 0 | 0 | 1 | 0 | 0 | 1 | 0 | 1 | 1 | 0 | | |
| 98 | 1 | 1 | 0 | 0 | 0 | 1 | 0 | 0 | 1 | 0 | 0 | 1 | 1 | 0 | 0 | 0 | | |
| 100 | 1 | 1 | 0 | 0 | 1 | 0 | 0 | 1 | 0 | 0 | 0 | 0 | 0 | 0 | 0 | 0 | | |
| 102 | 1 | 1 | 0 | 0 | 1 | 1 | 0 | 1 | 0 | 0 | 0 | 0 | 0 | 0 | 1 | 0 | | |
| 104 | 1 | 1 | 0 | 1 | 0 | 0 | 0 | 1 | 0 | 0 | 0 | 0 | 0 | 1 | 0 | 0 | $OC_4, OC_1, 8, 4$ | $OC_3\cdot OC_2\cdot\overline{OC}_1\cdot(8+4)$ |
| 106 | 1 | 1 | 0 | 1 | 0 | 1 | 0 | 1 | 0 | 0 | 0 | 0 | 0 | 1 | 1 | 0 | | |
| 108 | 1 | 1 | 0 | 1 | 1 | 0 | 0 | 1 | 0 | 0 | 0 | 0 | 1 | 0 | 0 | 0 | | |

FIG. 4B

FIG. 14

| BIT POSITION | DECIMAL VALUE | MIBCDA INPUTS | | | | | | | | | | | | | | | | | | | |
|---|---|---|---|---|---|---|---|---|---|---|---|---|---|---|---|---|---|---|---|---|---|
| | | X10,000 | | | | X1000 | | | | X100 | | | | X10 | | | | X1 | | | |
| | | 8 | 4 | 2 | 1 | 8 | 4 | 2 | 1 | 8 | 4 | 2 | 1 | 8 | 4 | 2 | 1 | 8 | 4 | 2 | 1 |
| $2^0$ | 1 | | | | | | | | | | | | | | | | | | | | X |
| $2^1$ | 2 | | | | | | | | | | | | | | | | | | | X | |
| $2^2$ | 4 | | | | | | | | | | | | | | | | | | X | | |
| $2^3$ | 8 | | | | | | | | | | | | | | | | | X | | | |
| $2^4$ | 16 | | | | | | | | | | | | | | | | X | | X | X | |
| $2^5$ | 32 | | | | | | | | | | | | | | | X | X | | | X | |
| $2^6$ | 64 | | | | | | | | | | | | | | X | X | | | X | | |
| $2^7$ | 128 | | | | | | | | | | | | X | | | X | | X | | | |
| $2^8$ | 256 | | | | | | | | | | | X | | | X | | X | | X | X | |
| $2^9$ | 512 | | | | | | | | | | X | | X | | | | X | | | X | |
| $2^{10}$ | 1024 | | | | | | | | X | | | | | | | X | | | X | | |
| $2^{11}$ | 2048 | | | | | | | X | | | | | | | X | | | X | | | |
| $2^{12}$ | 4096 | | | | | | X | | | | | | | X | | | X | | X | X | |
| $2^{13}$ | 8192 | | | | | X | | | | | | | X | X | | | X | | | X | |
| $2^{14}$ | 16384 | | | | X | | X | X | | | | X | X | X | | | | | X | | |
| $2^{15}$ | 32768 | | | X | X | | | X | | | X | X | X | | X | X | | X | | | |
| $2^{16}$ | 65536 | | X | X | | | X | | X | | X | | X | | | X | X | | X | X | |

United States Patent Office 3,535,502

Patented Oct. 20, 1970

3,535,502

MULTIPLE INPUT BINARY ADDER

Genung L. Clapper, Raleigh, N.C., assignor to International Business Machines Corporation, Armonk, N.Y., a corporation of New York Filed Nov. 15, 1967, Ser. No. 683,198
Int. Cl. G06f 7/385
U.S. Cl. 235—174 6 Claims

ABSTRACT OF THE DISCLOSURE

A multiple input binary adder comprising a plurality of multiple input binary adder sections, wherein each multiple input binary adder section comprises a plurality of super adders. The multiple input binary adder section can contain look ahead carry circuitry which also has super adders.

BACKGROUND OF THE INVENTION

Field of the invention

The field of the invention relates to a device for performing addition wherein a plurality of elements are interconnected to perform parallel addition wherein the radix is two.

Prior art

This invention relates to a binary adder and more particularly to a binary adder for adding a plurality binary coded numbers simultaneously.

At the present time the prior art consists of binary adders capable of adding two binary numbers simultaneously. An effort has been made to expand the capability of a binary adder and some success has been reached. The limit to this success, however, has been to the addition of three binary numbers added together simultaneously. Such a three input binary adder can be found in A. R. Geller's publication "Three-Input Binary Adder," IBM Technical Disclosure Bulletin, vol. 6, No. 6, November 1963, p. 46. With the advent of a high speed computer capable of carrying on multiple operations simultaneously, it would appear that further expansion of the number of binary inputs into a binary adder, to be added simultaneously, would be advantageous to this art.

It is also noted that binary adders are used in the construction of binary coded decimal adders on pp. 182–187 of Ivan Flores book entitled "Computer Logic, the Functional Design of Digital Computers," there a binary coded decimal adder that is comprised of two binary adders and correction circuitry. It therefore can be immediately realized that if one has a binary adder that is capable of adding, for example six binary numbers simultaneously, then a binary coded decimal adder capable of adding six binary coded decical numbers simultaneously can be obtained.

It is therefore an object of this invention to provide a multiple input binary adder that is capable of adding more than three binary numbers simultaneously.

It is another object of this invention to provide a first type of multiple input binary adder section (MIBAS–1) that is characterized by high speed operation and which can be used to form a multiple input binary adder.

It is another object of this invention to provide a second type of multiple input binary adder (MIBAS–2) having a maximum number of inputs by employing the most efficient use of super adders, which can be used to construct a multiple input binary adder.

It is another object of this invention to provide a multiple input binary coded decimal adder capable of adding more than three binary coded decimal numbers simultaneously by employing multiple input binary adders constructed of type 1 or type of 2 multiple input binary adder sections.

SUMMARY OF THE INVENTION

Briefly, the invention directs itself to the problem of adding a plurality of binary numbers simultaneously. The multiple input binary adder (MIBA) consists of a plurality of multiple input binary adder sections of type 1 or type 2 (MIBAS–1 or MIBAS–2). Each multiple input binary adder section is in itself a four bit binary adder capable of adding a plurality of four bit binary numbers simultaneously.

Each type of multiple input binary adder section (MIBAS–1 or 2) employs the use of super adders. Super adders are used to add the plurality of inputs to each bit position of the MIBAS. The MIBAS also has inputs from previous stages for entering the proper carry signals from the previous MIBAS and has outputs to the next MIBAS for transmitting the proper carry signals to the next MIBAS. The MIBAS has four output bits which represent the summation of the plurality of binary inputs to each of the four bit positions of the MIBAS.

The second type of the multiple input binary adder section also employs super adders to implement the look ahead carry concept.

By placing a plurality of either of these four bit multiple input binary adder sections in tandem, one can obtain a multiple input binary adder of any desired bit length. Either of these multiple input binary adder sections (MIBAS–1 or 2) can also be used to construct a multiple input binary coded decimal adder section (MIBCDAS). Each of the four bit multiple input binary coded decimal adder sections has correction circuitry and output circuitry associated with it.

A multiple input binary coded decimal adder section is formed by employing two MIBAS–1 and associated correction circuitry (CC). The first MIBAS–1 is employed as a correction accumulator, the second MIBAS–1 is employed as an output accumulator and the correction circuitry (CC) is used to generate proper correction factors from the outputs of the correction accumulator and to feed said correction factors as inputs to the output accumulator.

Another multiple input binary coded decimal adder section is formed by having the output carry signals and the four output bit positions of a MIBAS–2 connected as inputs to the associated correction and output circuitry (COC). The correction and output circuitry has corrected output carry signals and a four bit position binary number which acts as the outputs from the multiple input binary coded decimal adder section. The combination of the corrected output carry signals and the four bit position binary output number will provide the binary coded decimal summation of the plurality of binary coded decimal numbers that was entered as inputs to the MIBAS–2.

BRIEF DESCRIPTION OF THE DRAWINGS

The foregoing and other objects, features and advantages of the invention will be apparent from the foregoing and more particular description of the preferred embodiments of the invention, as illustrated in the accompanying drawings.

In the drawings:

FIGS. 4A and 4B are tables showing the sum of the multiple input binary adder stage in decimal form, the sum of the multiple input binary adder stage in binary form, the summation of the inputs to the multiple input binary adder stage in binary coded decimal form and the correction factor necessary to correct the output of the multiple input binary adder stage to obtain the sum of the multiple input binary adder stage in corrected binary coded decimal form.

FIG. 14 is a table showing the binary coded decimal component of the decimal value represented by each binary power of 2.

EMBODIMENT 1.—FOUR BIT MULTIPLE INPUT BINARY ADDER SECTION TYPE 1 (MIBAS–1)

Description

To provide a clear description of the invention and its operation the invention will be described first as a single four bit multiple input binary adder section. This will allow a full understanding as to the operation of the individual components making up the multiple input binary adder section. Since all multiple input binary adder sections are constructed exactly the same, no detail circuit description will be needed when the discussion refers to a MIBA comprised of a plurality of MIBAS. It should be noted that all MIBAS–1 will be referred to as MIBAS within this embodiment, to provide ease of description.

Figure 1:
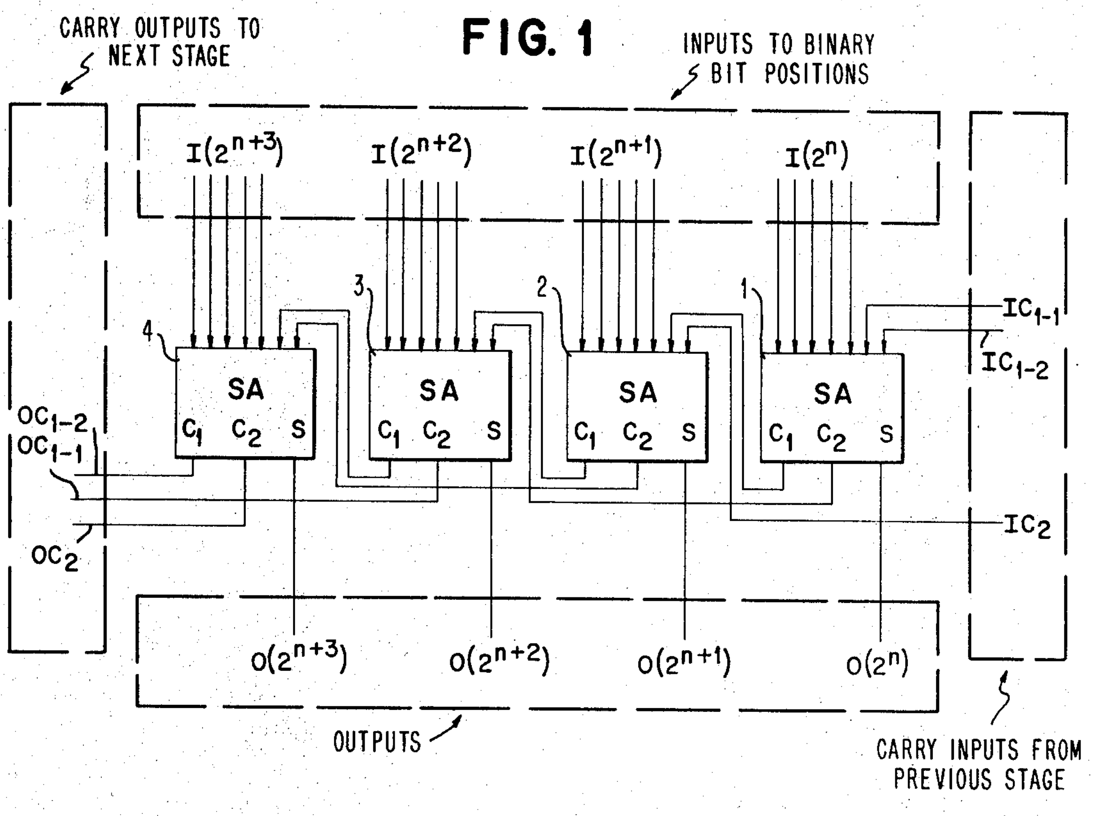
FIG. 1 shows a logic diagram of a four bit multiple input binary adder stage type 1( MIBAS–1).

With reference to FIG. 1, it can be seen that MIBAS is constructed by employing a combination of super adders.

In general, a super adder is a circuit that has the capability of adding a plurality of binary inputs and expressing the summation of the plurality of binary inputs as a binary number. The number of output binary bit positions of a given super adder is dictated by the number of binary bits that are needed to express in binary form the decimal number of inputs. For example if a given super adder had 16 inputs then it would have 4 outputs. For the sake of simplicity and ease in understanding, the inventor will use throughout this application super adders having 7 binary inputs and expressing the summation of the 7 binary inputs as a three bit binary number. It should be realized that super adders having a greater capacity for adding more than 7 binary inputs are available and the inventer does not intend to limit the scope of his invention to a super adder having only 7 binary inputs.

Figure 3A:
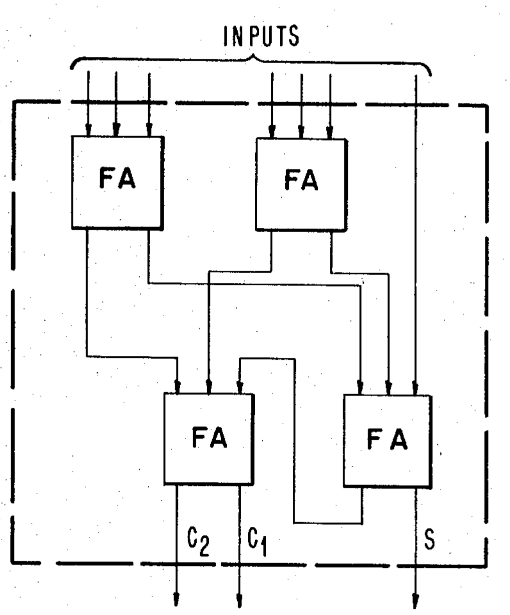
FIG. 3*a* shows a first embodiment of a super adder.

FIG. 3*a* shows one method of constructing a super adder by simple logic. It should be noted that there are seven inputs and three outputs. As previously stated the output is a three bit binary number with the S representing the low order bit, the $C_1$ representing the second order bit and the $C_2$ representing the third order bit. The output line S is the mod 2 summation of the seven binary input bits, the $C_1$ output represents a first order carry and the $C_2$ output represents a second order carry.

Figure 3B:
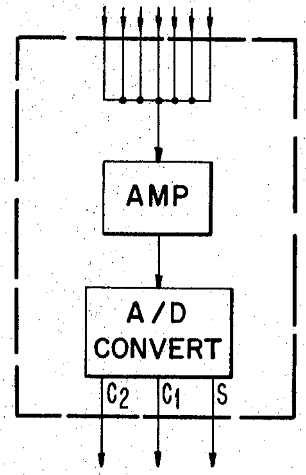
FIG. 3*b* shows a second embodiment of a super adder.

Now in reference to FIG. 3*b*, a second method of obtaining a super adder is shown. This super adder is obtained by algebraically adding the seven binary input bits to create an analog signal whose magnitude is a function of the seven binary inputs. An analog to Binary converter is used to obtain a three bit binary number having the same designations S, $C_1$, and $C_2$ as in the previous super adder described. One type of Analog to Binary converter that lends itself readily to the construction of a super adder is the Analog to Binary converter described in U.S. 3,193,668 entitled "Analog to Binary Conversion Apparatus."

Figure 3C:
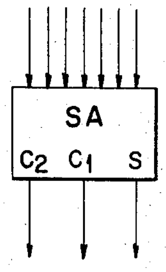
FIG. 3*c* shows the logic symbol for a super adder.
Figure 5:
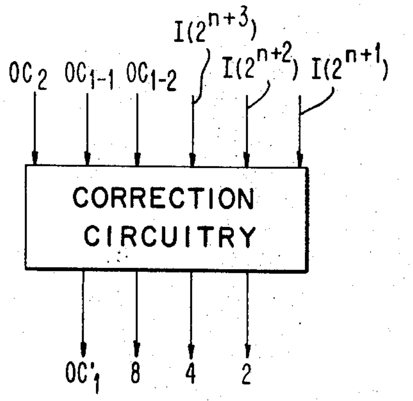
FIG. 5 shows the logic symbol for the correction circuitry (CC).

Attention is now drawn to FIG. 3*c*, which shows the logic symbol for a super adder. It should be noted that there are many other logic configurations that can be used to obtain a super adder as described in these preceding pragraphs.

Now returning to FIG. 1, it can be seen that the multiple input binary adders stage shown is capable of adding up to five binary numbers simultaneously and consists of four super adders 1, 2, 3, and 4 connected to form a four bit binary adder. Each of the four super adders represents one of the four input bit positions of the plurality of input numbers.

Super adder 1 is the low order bit position adder. Super adder 1 has as its input the five $I(2^n)$ inputs from the five binary numbers to be added and two first order carry inputs ($IC_{1-1}$, $IC_{1-2}$) from the previous MIBAS. The low order output S of the super adder 1 is the low order output bit $O(2^n)$ of the sum of the binary inputs being added. The second order output $C_1$ of super adder 1 is fed into super adder 2 as a carry signal. In similar manner, the third order output $C_2$ of super adder 1 is fed into super adder 3 as a carry input.

Super adder 2 has as its other inputs the five $I(2^{n+1})$ binary numbers to be added and a second order carry input $IC_2$. The low order output bit S of super adder 2 is the second order output bit $O(2^{n+1})$ of the sum of the binary inputs being added. The second order output $C_1$ from super adder 2 is also connected as a carry input to super adder 3. The third order output $C_2$ of super adder 2 is fed into super adder 4 as a carry input.

Super adder 3 has as its other inputs the five $I(2^{n+2})$ binary bits of the 5 binary numbers to be added. The low order output S of super adder 3 is the third order output bit position $O(2^{n+2})$ of the sum of the binary inputs being added. The second order output $C_1$ of super adder 3 is connected to super adder 4 as a carry input. The third order output $C_2$ of super adder 3 is a first order carry output $OC_{1-1}$ of the MIBAS.

Super adder 4 has as its other inputs the five $I(2^{n+3})$ binary bits of the five input binary numbers to be added. The low order output S of super adder 4 is the fourth order output bit $O(2^{n+3})$ of the sum of the binary inputs being added. The second order output $C_1$ of super adder 4 is a first order carry output $OC_{1-2}$ of the MIBAS. The third order output $C_2$ of super adder 4 is the second order carry output $OC_2$ of the MIBAS.

Figure 2:
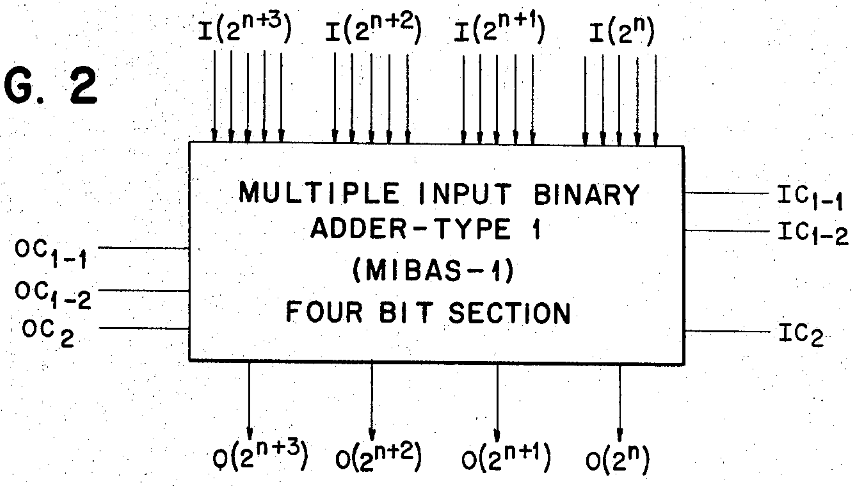
FIG. 2 shows the logic symbol for the four bit multiple input binary adder section type 1.

FIG. 2 shows the logic symbol for a four bit multiple input binary adder type 1. It can be seen that the block consists of three carry inputs $IC_{1-1}$, $IC_{1-2}$, and $IC_2$ from the previous MIBAS, three carry outputs $OC_{1-1}$, $OC_{1-2}$, $OC_2$ to the next MIBAS, four output bit positions representing the summation of the 5 binary numbers being added and the four orders of input bits each comprising 5 inputs.

Operation

In order to obtain an understanding as to the operation of a multiple input binary adder type 1, a specific example will be used. Let it be assumed that the five binary numbers to be added are all the same and consist of all 1's. This being true the five inputs to each of the super adders 1, 2, 3, and 4, from the binary numbers to be added will all be 1's. Further let it be assumed, that there are no first order input carry or second order input carry signals from the previous MIBAS stage.

Under these conditions super adder 1 will have as its inputs the five 1's from the five input numbers and two 0's from the first order carry inputs from the previous MIBAS stage. The output of super adder 1 will be $S=1$, $C_1=0$, and $C_2=1$. Super adder 2 has as its input the five 1's from the five input binary numbers, a 0 from $C_1$ of super adder 1 and a 0 from the second order carry input $IC_2$. The outputs of super adder 2 will be $S=1$, $C_1=0$, and $C_2=1$. Super adder 3 has as its inputs the five 1's from the five input binary numbers to be added, a 0 from the $C_1$ of super adder 2 and a 1 from $C_2$ of super adder 1. Super adder 3 has as its outputs $S=,0$ $C_1=1$, and $C_2=1$ (which is a first order carry output $OC_{1-1}$ to the next MIBAS stage). Super adder 4 has as its inputs the five 1's from the five binary numbers to be added, a 1 from $C_1$ of super adder 3 and a 1 from $C_2$ of super adder 2. The output of super adder 4 are $S=1$, $C_1=1$ which is a first order carry output $OC_{1-2}$ of the MIBAS to the next MIBAS) and $C_2=1$ (which is a second order carry output $OC_2$ of the MIBAS to the next MIBAS).

The correctness of this summation can be realized if it is assumed that the four bits added by this MIBAS section were the four low order bits of the five binary numbers that were added. This being so, super adder 1 added the $2^0$ bit, super adder 2 added $2^1$ bit, super adder 3 adder $2^2$ bit and super adder 4 added $2^3$ bit. The decimal value of the four bits in each of the five binary numbers is 15 and the summation of the five binary numbers expressed in decimal form would be equal to 75. If the summation was properly carried out by the MIBAS the summation of the four binary outputs $O(2^n)$, $O(2^{n+1})$, $O(2^{n+2})$, $O(2^{n+3})$, and the output carry signals $OC_{1-1}$, $OC_{1-2}$, and $OC_2$ should also add up to a decimal value of 75. Super adder 1's output S represents the $2^0$ output bit which was equal to a 1 and has a decimal equivalent value of a 1. Super adder 2's output S represents the $2^1$ output bit and was equal to a 1 and has a decimal equivalent of 2. Super adder 3's output S represents the $2^2$ bit and was equal to a zero, therefore the decimal weighted value to be added is equal to zero. Super adder 4's output S represents the $2^3$ bit which was equal to a 1 and has a decimal equivalent of 8. Both first order output carries $OC_{1-1}$ and $OC_{1-2}$ of the MIBAS stage were equal to a 1 and represent a binary $2^4$ bit which has a decimal equivalent of 16. The second order output carry $OC_2$ was also equal to a 1 and has a decimal output weighted value of 32. The summation of the decimal values of the four output bits plus the three output carries are $1+2+0+8+16+16+32=75$. It therefore can be realized that the MIBAS properly added the five binary numbers simultaneously.

Another example of the operation of the MIBAS is presented to show the versatility and the ramifications on the state of the art of this invention. The MIBAS is used to construct a multiple input binary coded decimal adder section which has the capability of adding a plurality of BCD numbers simultaneously. Each multiple input binary coded decimal adder section represents one decimal place of the BCD number to be added. The MIBAS lend themselves nicely to the construction of multiple input binary coded decimal adder sections since each mutliple input binary adder section comprises four binary bits which is the number of binary bits necessary to represent a decimal place in a binary coded decimal number.

As has been stated before, it is commonly known that a binary coded decimal adder can be comprised of two binary adders and correction circuitry. It is therefore the intention to show here that the multiple input binary adder sections can replace the well known binary adders in the prior art and with an expansion of the correction circuitry form in similar fashion a well known binary coded decimal adder.

In the construction of the multiple input binary coded decimal adder section, the number of BCD numbers (entered into the adder will be one less than the number of binary numbers) that the MIBAS could normally add. The reason for this will be found in the forthcoming discussion. The MIBAS used in this example will have the capacity of adding five binary numbers simultaneously.

There must be realized that the highest number that can be represented in a given decimal place in a binary coded decimal number is a 9 which when represented in binary form is a 1001. Therefore, the greatest decimal number that can be inputted into a multiple input binary coded decimal adder section will be 4 times 9 or 36 plus whatever correction and carry factors that may enter through the 4 inputs $IC_{1-1}$, $IC_{1-2}$, $IC_2$ and $IC_1'$. The greatest carry that can be entered into a multiple input binary coded decimal section can be determined by examining the unit place of a binary coded decimal number. The multiple input binary coded decimal adder section that is used in the units place of the binary coded decimal number will have the four inputs equal to zero. The maximum decimal number that has to be represented by the multiple input binary coded decimal adder section will be a decimal 36 or in BCD form a 001 (X10) 0110 (X1)

The term 0110 (X1) will be represented by the four output bits $O(2^{n+3})$, $O(2^{n+2})$, $O(2^{n+1})$, and $O(2^n)$ from the multiple input binary coded decimal adder section. It can be realized that the decimal value of the carry signal is at most a 30 from the units place of the BCD number to the 10's place of the BCD number. The greatest decimal number that can be entered into any multiple input binary coded decimal adder section will be a 39, 36 by the four BCD numbers to be added and at most a 3 from carry inputs $IC_{1-1}$, $IC_{1-2}$, $IC_2$, and $IC_1'$.

Now referring to FIG. 4, which shows the determination of the correction factors needed in the correction circuitry to correct the summation of the MIBAS acting as the correction accumulator to be added into the MIBAS acting as the output accumulator to obtain the binary coded decimal representation of the four binary coded decimal numbers being added. The table shows that the correction factor for a maximum decimal representation of 36 and for 39 are the same. Therefore, the correction circuitry needed for the units place of the binary coded decimal number will be the same as for any other decimal place of the binary coded decimal number. It should here be noted that the correction factors that must be implemented will consist of all the logic statements up to and including the maximum number to be corrected. One type of multiple input binary coded decimal adder sections can be constructed and used in any desired place of the multiple input binary coded decimal adder that is composed of a plurality of multiple input binary coded decimal adder sections placed in tandem.

FIG. 4 also shows the equivalent binary coded decimal representation for some sums that might appear as the output of the MIBAS. Also shown in FIG. 4 is the corretion factors necessary for changing the binary number from the MIBAS to the proper binary coded decimal representation of that number.

FIG. 4 only shows even decimal numbers since a legal even binary coded decimal number cannot become an illegal odd binary coded decimal number by adding a one to a legal even binary coded decimal number. This can be further realized by noting that there is never a need to add a correction factor to the ones position in a decimal place of the binary coded decimal number.

In order to perform a proper correction, the procedure normally followed is to interrogate the output of a binary register to determine the proper correction factor to be added to the output of a binary register to obtain the proper binary coded decimal representation. This embodiment follows this concept and therefore it is necessary to interrogate the binary number represented by the three high order output bit positions and the three carry outputs $OC_{1-1}$, $OC_{1-2}$ and $OC_2$ from the MIBAS to determine the proper correction factor to be added to a second MIBAS which has the same BCD inputs as the first MIBAS. With reference to FIG. 4, the criteria used to determine if a correction is needed is stated by the logic statement where a dot represents an AND function and a plus an OR function. The $OC_1$ refers to an equivalent first order carry output to the next high order MIBAS. In like manner, $OC_2$, $OC_3$ referred to a second order carry output and a third order carry output to the next high order stage.

If the logic expression for a sum 10–19 is satisfied, a corrector factor equivalent to a 4 and 2 must be added to the $I(2^{n+1})$ and $I(2^{n+2})$ input bit positions of the MIBAS acting as the output accumulator. If the logic expression for 20–29 is satisfield, an 8 and 4 must be added to the $I(2^{n+3})$ and $I(2^{n+2})$ input bit positions of the MIBAS acting as the output accumulator. If the logic expression for 30–39 is satisfied, a 2 must be added to the $I(2^{n+1})$ input bit position of a MIBAS acting as the output accumulator and an output first order carry correction $OC_1'$ must be generated to the next multiple input binary coded decimal adder stage.

It is felt that anyone skilled in the art can express these logic statements in logic form. Attention is now drawn to FIG. 6 which shows the correction circuitry (CC). No detailed discussion will be given since it is felt that anyone skilled in the art is capable of understanding this basic logic circuit and since there is a multitude of alternate ways of expressing the same logic statements in logic form. This circuitry is shown here to show one specific means by which the logic statements could be implemented so as to provide continuity to the description of the invention.

Figure 6:
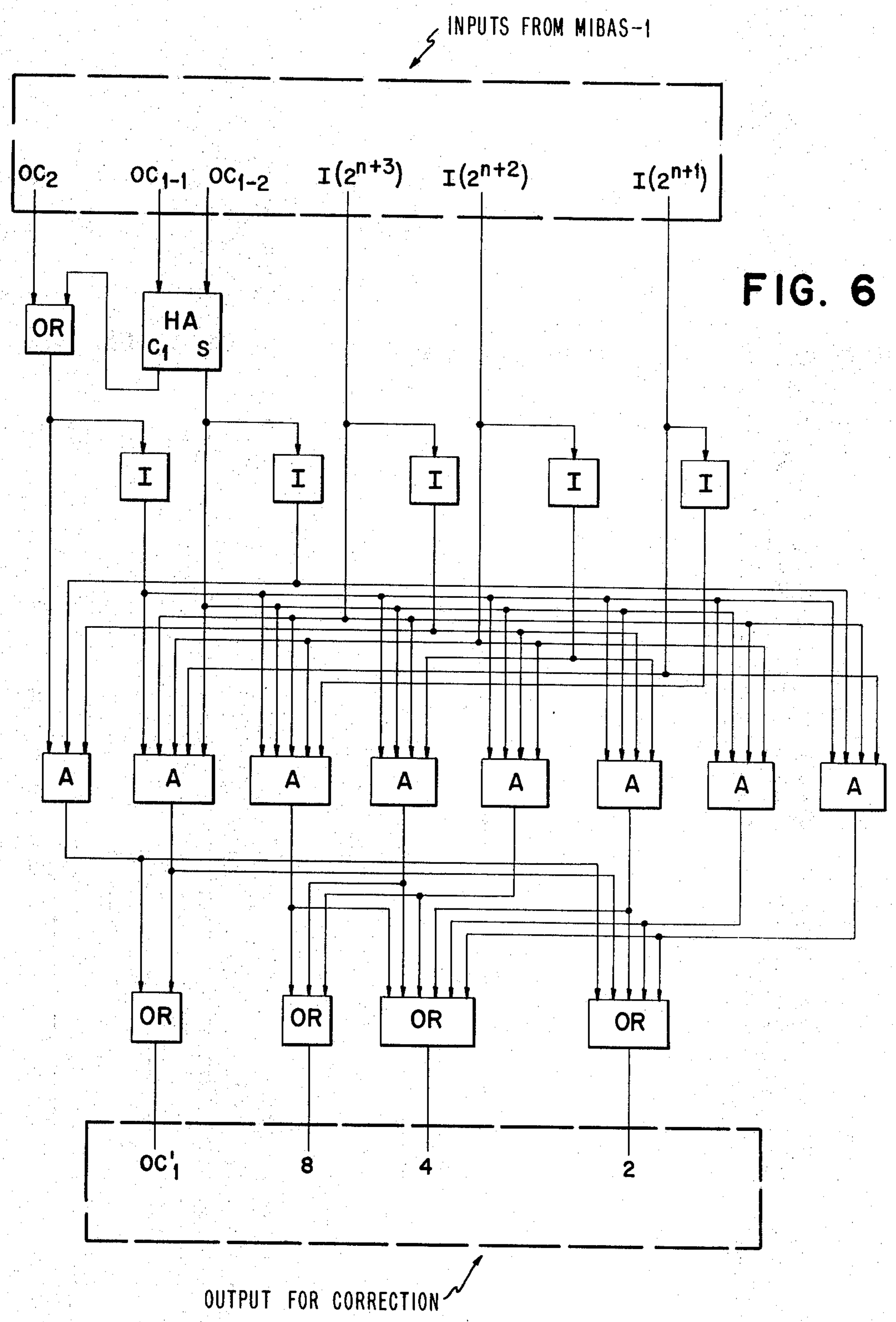
FIG. 6 shows a logic diagram of the correction circuitry.

FIG. 6 shows the logic symbol to express the correction circuitry (CC) as used in this example.

The correction circuitry (CC) has as its inputs the three output carrys $OC_{1-1}$, $OC_{1-2}$, and $OC_2$ and the three higher order output bit positions $O(2^{n+3})$, $O(2^{n+2})$ and $O(2^{n+1})$ of the MIBAS acting as the correction accumulator. The outputs of the correction circuitry (CC) are the correction factors to be added to the MIBAS acting as the output accumulator. The correction factors are a BCD weighted value of 2, 4, 8 and 10($OC_1'$).

Figure 7:
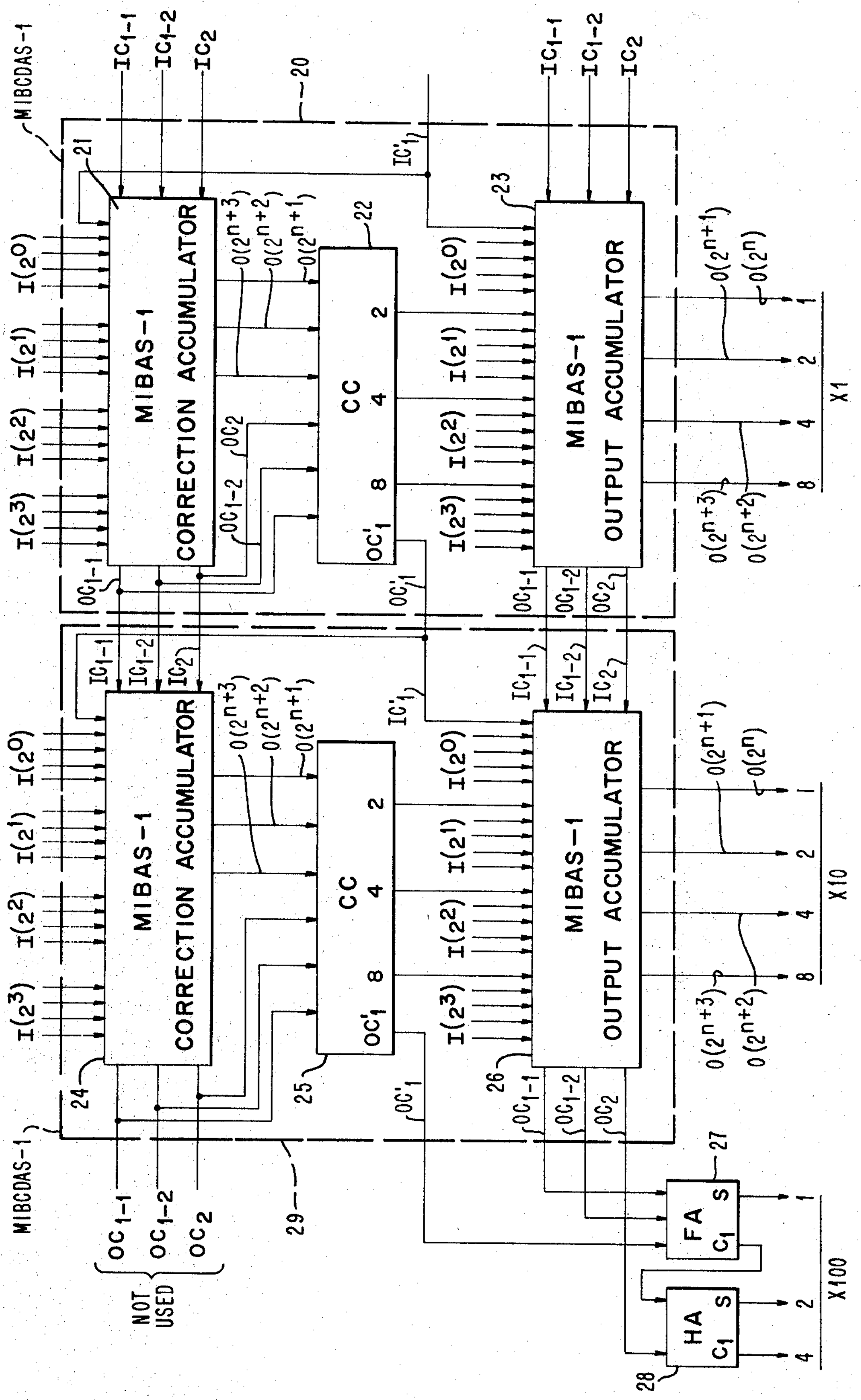
FIG. 7 shows a two decimal place binary coded decimal adder which was comprised of multiple input binary adder stages type 1 and correction circuitry.

Now referring to FIG. 7, a two decimal place binary coded decimal adder is shown that is capable of adding four binary coded decimal numbers having two decimal places) at the same time. Again assume that the four different binary coded decimal numbers have all the same value of 1001 (X10) 1001 (X1). The decimal equivalent of this binary coded decimal number is 99. Summation of 4 BCD numbers has a value equal to a decimal 396 and a binary coded decimal value of 0011 (X100) 1001 (X10) 0110 (X1). The multiple input binary coded decimal adder is made up of two multiple input binary coded decimal adder sections 20 and 23 connected in tandem. Each multiple input binary coded decimal adder section comprises a first MIBAS acting as the correction accumulator, a correction circuitry and a second MIBAS acting as an output accumulator.

The multiple input binary coded decimal adder section 20 has as its inputs the unit decimal place of the four BCD numbers to be added. These inputs are entered into the correction accumulator 21 and into the output accumulator 23. The carry inputs to the correction accumulator, the carry inputs to the output accumulator and the input carry correction $IC_1'$ are all equal to zero in the MIBCDAS 20. With four binary coded decimal numbers equaling a decimal 9, the summation of the correction accumulator 21 of the multiple input binary coded decimal adder section 20 will be a decimal 36. It can be shown that the output of the correction accumulator 21 will be $OC_{1-1}=0$, $OC_{1-2}=0$, $OC_2=1$, $O(2^{n+3})=0$, $O(2^{n+2})=1$, $O(2^{n+1})=0$ and $O(2^n)=0$. It can be realized that this is a correct addition of the four binary numbers imputted into the MIBAS acting as a correction accumulator, as the decimal summation of the $OC_2$ having a weighted value of 32 and $O(2^{n+2})$ having a weighted value of 4 is equal to a decimal value of 36. It should be noted, however, that this is not in proper BCD form.

The three carry outputs and the three high order output bit positions of the correction accumulator 21 are connected as inputs to the correction circuitry 22. The correction circuitry 22 will generate two correction factors. The first correction factor will be entered as a 1 (decimal equivalent equal to a 2) into the second input bit position $I(2^{n+1})$ of the output accumulator 23. A second correction factor of a first order output carry correction $OC_1'$ will be generated to the next multiple input binary coded decimal adder section.

Under these conditions, it can be shown that the outputs of the output accumulator 23 will be as follows: $OC_2=1$, $OC_{1-1}=0$, $OC_{1-2}=0$, $O(2^{n+3})=0$, $O(2^{n+2})=1$, $O(2^{n+1})=1$ and $O(2^n)=0$.

The multiple input binary coded decimal adder section 29 will have as its input the 10's place of the four BCD numbers to be added, three carry inputs to the correction accumulator 24 from correction accumulator 21, three carry inputs to output accumulator 26 from the output accumulator 23 and a correction input to both the correction accumulator 24 and the output accumulator 26 low order $I(2^n)$ bit positions. The existence of the correction factor which is inputted to the correction accumulator 24 and the output accumulator 26 necessitates the use of one of the low order input bit positions of the respective MIBAS's and therefore limits the number of useful MIBAS inputs to four. It is for this reason that only four BCD numbers can be added in this specific example. In general, it can be seen that a multiple input binary coded decimal adder stage can accommodate one less BCD number than the number of binary numbers that can be accommodated by the multiple input binary adder stages that are used to construct the multiple input binary coded decimal adder stage.

The correction accumulator 24 and multiple input binary coded decimal adder stage 29 has its inputs four 9's from the four BCD numbers to be added. Other inputs to the correction accumulator 24 are the second order carry input $IC_2=1$, two first order carry input signals=0 and a first order input carry correction factor $IC_1'=1$. The decimal summation of these inputs will be equal to 39.

It can be shown that the output of the correction accumulator 24 will be as follows: $OC_2=1$, $OC_{1-1}=0$, $OC_{1-2}=0$, $O(2^{n+3})=0$, $O(2^{n+2})=1$, $O(2^{n+1})=1$ and $O(2^n)=1$. The three carry outputs and the three high order output bit positions of correction accumulator 24 are entered as inputs into correction circuitry 25. Correction circuitry 25 will generate a first correction factor of a 2 which will be entered as a binary 1 into the second input bit position $I(2^{n+1})$ of the output accumulator 26. The correction circuitry will also generate a first order output carry correction factor $OC_1'$.

Output accumulator 26 has as its inputs the four 9's of the four BCD numbers to be added, a second order carry input $IC_2=1$, a correction factor entered into the second order bit position $I(2^{n+1})$ and a first order carry correction factor $IC_1'$ entered into the first order bit position $I(2^n)$. It again can be shown that the output accumulator 26 will sum all these inputs simultaneously to obtain an output as follows: $OC_2=1$, $OC_{1-1}=0$, $OC_{1-2}=0$, $O(2^{n+3})=1$, $O(2^{n+2})=0$, $O(2^{n+1})=0$ and $O(2^n)=1$.

To complete the multiple input binary coded decimal adder it is necessary to interrogate the three output carries and the first order output carry correction factor $OC_2$ from the multiple input binary coded decimal adder section that is associated with the highest decimal place of the binary coded decimal numbers to be added.

This can be seen as full adder 27 and half adder 28. Full adder 27 adds all first order carries out of the multiple input binary coded decimal adder section 29. Half adder 28 adds the second order carry output $OC_2$ from the multiple input binary coded decimal adder section 23 and the first order carry $C_1$ from full adder 27. The low order output S of full adder 27 will establish the low order bit position $O(2^n)$ of the highest decimal place of the resulting BCD number from the summation of a plurality of BCD numbers. Half adder 28's low order output S will represent the second order binary bit position $O(2^{n+1})$ and the first order carry $C_1$ of half adder 28 will represent the third order binary bit position $O(2^{n+2})$ of the high decimal place of the resulting BCD number.

In our example, full adder 27 will have a 1 input from the first order carry correction output $OC_1'$ and 0's inputs from both first order carry outputs $OC_{1-1}$ and $OC_{1-2}$ from the multiple input binary coded decimal adder stage 29. The outputs of full adder 27 will be output $S=1$ and first order carry $C_1=0$. Half adder will have as its inputs a 1 from the second order output carry from the output accumulator 26 of the multiple input binary coded decimal adder section 29 and a 0 from the first order carry $C_1$ from full adder 27. The output of half adder 28 will be $S=1$ and $C_1=0$.

In summation, it can be seen that the resulting BCD number from the summation of four BCD numbers having a decimal value of 99 will have a BCD value of 0011 (X100) 1001 (X10) 0110 (X1) or a decimal value of 396 which was the predicted value at the beginning of this example.

It is therefore apparent that by the use of this example that the first type of multiple input binary adder sections create multiple input binary adders by placing a plurality of multiple input binary adder sections in tandem. It is further apparent that multiple input binary coded decimal adder sections have been created by the combining of two multiple input binary adder sections with the proper correction circuitry. It is still further apparent that a multiple input binary coded decimal adder has been obtained by placing in tandem a plurality of multiple input binary coded decimal adder sections which comprise multiple input binary adder sections of type 1.

EMBODIMENT 2.—FOUR BIT MULTIPLE INPUT BINARY ADDER SECTION TYPE 2 (MIBAS–2)

Description

The second embodiment of this invention sets forth the most efficient method of employing the inputs to the multiple input binary adder section. The requirements set forth in this embodiment is that only one input of each super adder may be used as a carry input.

With reference to FIG. 2, it can be seen that MIBAS–2 is constructed by employing a combination of super adders, half adders and full adders.

The construction of operation of half adders and full adders are well known in the art. The construction, operation and truth table for half adders and full adders can be readily found in Maley and Earle's book entitled "Logic Design of Transistor Digital Computers" on pp. 161–164. The construction of the super adders has previously been described in Embodiment 1 and will not be described again.

It should be realized that throughout the discussion of this embodiment of the invention the term MIBAS will apply to MIBAS-type 2 only. It is further assumed that all super adders used within this embodiment will be of the type that is characterized by 7 inputs and 3 outputs.

It can be seen that the multiple input binary adder stage consists of four super adders 10, 11, 12 and 13 connected to form a functional four bit binary adder which incorporates the use of a look ahead ripple carry. Each of the four super adders represents one of the four input bit positions of the plurality of input numbers.

Super adder 10 is the low order bit position adder. Super adder 10 has as its inputs the six $I(2^n)$ inputs from the six binary numbers and a first order carry input $IC_1$ from the previous MIBAS. The output S from super adder 10 is the low order output bit of the sum of the six binary numbers being added.

In order to maintain the greatest flexibility, it will require that only one input of the four to each super adder 10, 11, 12, 13 be employed as a carry input, and therefore, it was necessary to use the look ahead carry technique. The look ahead carry technique embodies the concept that if a carry to a given SA stage can be generated by more than one source, than a carry into that respective super adder stage may not in fact be needed. For example, assume that a carry signal into a super adder can be generated from three locations, the following set of conditions can exist; first, if all locations do not initiate a carry then clearly no carry is needed to the super adder; second, if any one of the three locations generates a carry then clearly a carry signal is needed to the super adder; third, if any of the three locations generate a carry signal, then no carry signal is needed to the super adder but a carry signal is needed to the next higher order super adder since two first order carries are the equivalent of a second order carry; and fourth, if all three sources generate a carry than a carry is necessary to both the super adder and to the next higher order super adder since two of the first order carries would act as a second order carry and the third first order carry would act as a first order carry. It therefore can be realized that by taking the binary summation of the carry signals for each stage that it can be determined whether a carry signal is needed for that stage and if a carry signal should be sent to higher order stage.

This concept of look ahead carry is used in the multiple input binary adder section, type 2. Half adder 14 has as its input the first order carry from super adder 10 and the second order carry input $IC_2$ from the preceding MIBA stage. The low order output S of the half adder 14 is connected to super adder 11 as a carry input. The high order output $C_1$ of half adder 14 is connected to an input of super adder 15 which acts as the adder of the carry sources for super adder 12.

Super adder 15 has as its other inputs the second order carry $C_2$ from super adder 10, the first order carry $C_1$ from super adder 11, and the third order carry input $IC_3$ from the previous MIBAS. The low order output S of super adder 15 is fed as a carry signal to super adder 12. The second order output $C_1$ of the super adder 15 is connected to super adder 16 which is the adder for the carry signals to determine the carry for super adder 13. The order output $C_2$ of super adder 15 is connected as an input to super adder 17 which is the adder of all the carry sources to determine the first order carry output $OC_1$ of the four bit multiple input binary adder section.

Super adder 16 has as its other inputs the first order carry $C_1$ from supper adder 12, the second order carry from $C_2$ from super adder 11 and the input fourth order carry input $IC_4$ from the previous MIBAS. The low order output S of super adder 16 is connected to super adder 13 as a carry signal, the second order output signal $C_1$ is connected to super adder 17 which is the adder of all carry sources for the first order carry output $OC_1$ of the multiple input binary adder section. The second order output $C_2$ of super adder 16 is connected to full adder 18 which is the adder of all carry sources to determine the second order carry output $OC_2$ of the multiple input binary adder section.

Super adder 17 has as its other inputs the first order carry $C_1$ from super adder 13 and a second order carry $C_2$ from super adder 12. The low order output S of super adder 17 is the first order carry output $OC_1$ of the multiple input binary adder, the second order carry $C_1$ is an input to full adder 18 which is the adder of all sources to determine the second order carry output $OC_2$ of the multiple input binary adder section. The third order output $C_2$ of super adder 17 is connected to HA 19 which adds all carry sources for determining the third order carry output $OC_3$ and the fourth order carry output $OC_4$ of the multiple input binary adder section.

FA 18 has as its other input the second order carry $C_2$ for SA 13. FA 18's low order output S acts as the second order carry output $OC_2$ of the multiple input binary adder stage and the second order output $C_1$ is connected as the second order input to HA 19 for determining the third order carry output $OC_3$ and the fourth order carry output $OC_4$ of the multiple input binary adder section. Half adders 19 low order output S is the third order carry output $OC_3$ to the next MIBA stage and the second order output $C_1$ is the fourth order carry output $OC_4$ to the next MIBA stage.

Super adder 10 has as its inputs the six first order bit positions from the six binary inputs and the input first order carry $IC_1$, from the preceding MIBAS. The first order output S of SA 10 is the first order output bit position of the MIBAS. Super adder 11 has as its input the second order bit positions and a carry from HA 14. Super adder 11 first order output S is the second order output bit position of the multiple input binary adder section. Super adder 12 has as its input the third order bit positions of the six binary numbers to be added and to carry from SA 15. SA 12's low order output S is the third order output bit position of the multiple input binary adder section. SA 13 has as its input the fourth order bit positions of the six binary numbers to be added and a carry from SA 16. The low order output S of super adder 13 is the fourth order output bit position of the multiple input binary adder.

Figure 9:
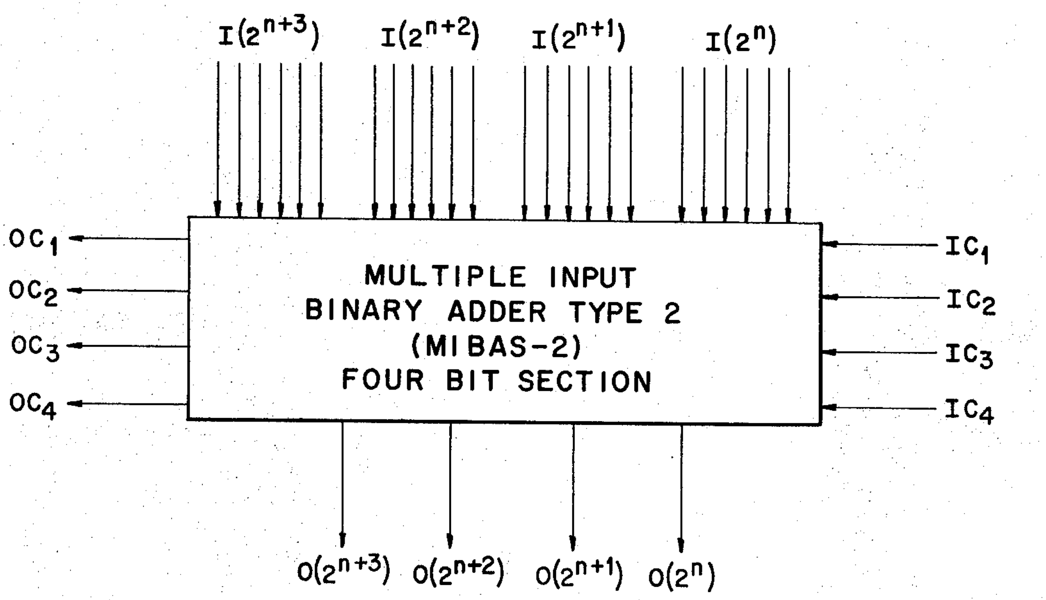
FIG. 9 shows the logic symbol for the four bit multiple input binary adder section type 2.

With reference to FIG. 9, Section 1 shows the logic symbol for a four bit multiple input binary adder. It can be seen that the block consists of four carry inputs $IC_1$, $IC_2$, $IC_3$, and $IC_4$ from the previous MIBAS, four carry outputs $OC_1$, $OC_2$, $OC_3$, and $OC_4$ to the next MIBAS; four output bit positions representing the summation of the six binary numbers being added and the four orders of input bits, each order comprised of six inputs to represent the six inputs to the respective four order super adders 10, 11, 12, 13.

Operation

Figure 10:
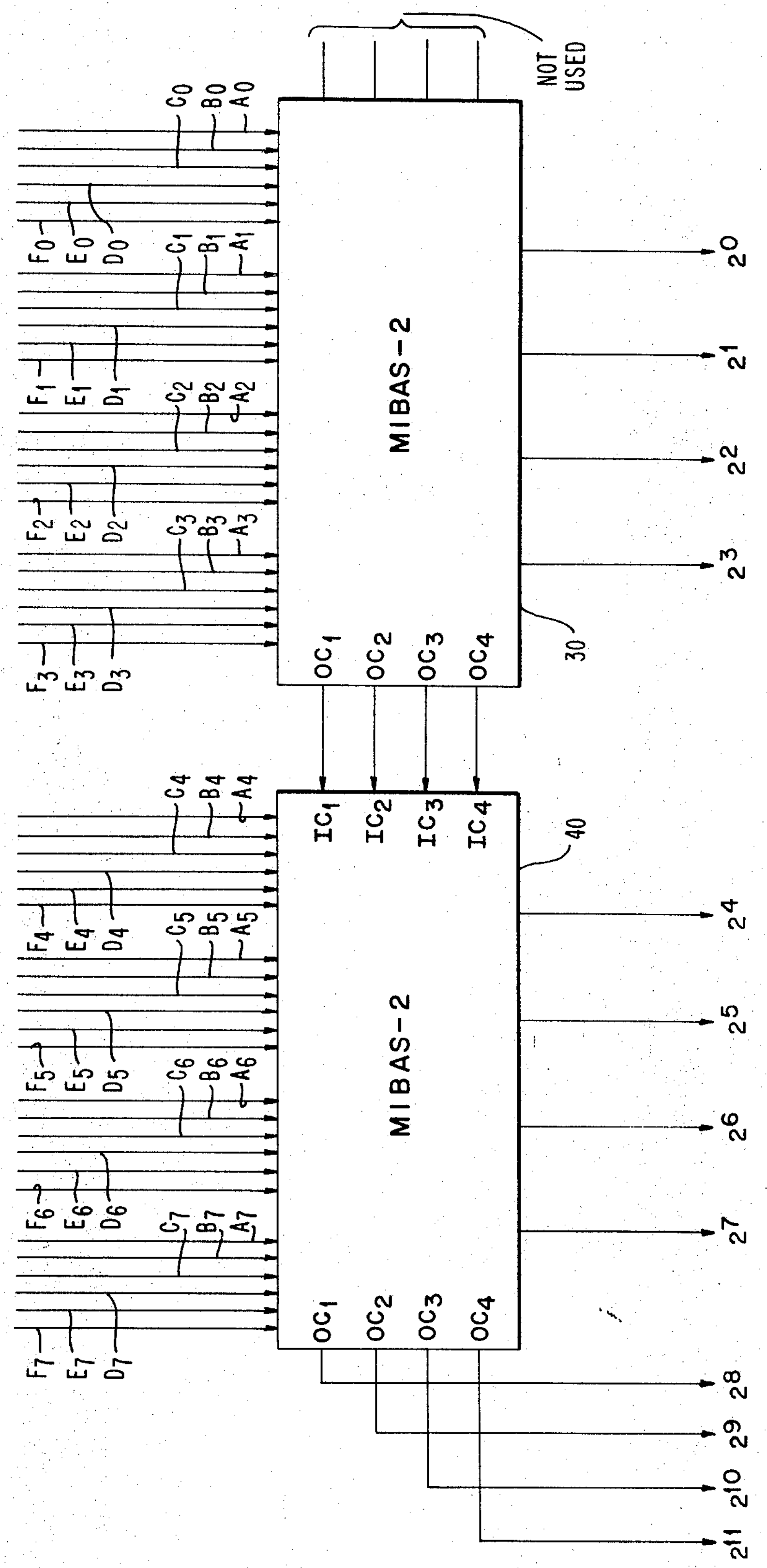
FIG. 10 shows an 8 bit multiple input binary adder comprised of two multiple input binary adder sections type 2.

In order to best obtain an understanding as to the operation of a multiple input binary adder, a specific example will be used. With reference to FIG. 10, it can be seen that an eight bit multiple input binary adder can be formed by putting in tandem two four bit multiple input binary adder sections (MIBAS–2).

The carry outputs $OC_1$, $OC_2$, $OC_3$, and $OC_4$ of multiple input binary adder section 30 are connected to the carry inputs $IC_1$, $IC_2$, $IC_3$, and $IC_4$ of multiple input binary adder section 40. The carry output lines $OC_1$, $OC_2$, $OC_3$, and $OC_4$ of multiple input binary adder section 40 will act as the last four highest order output bits of the summation of the six eight bit binary numbers to be added. The four carry inputs $IC_1$, $IC_2$, $IC_3$, and $IC_4$ of multiple input binary adder section 30 are not used.

Let it be assumed that the six eight bit binary numbers to be added are all the same and that the binary number is 11111111. If these eight bit binary numbers are added together the binary summation should equal 101 1111 1010. Now referring to FIG. 8, assume that the circuitry shown is for the multiple input binary adder section 30. First it should be realized that all carry inputs $IC_1$, $IC_2$, $IC_3$, and $IC_4$ will be equal to zero since there is no preceding MIBAS.

Super adder 10 will have six inputs equal to 1 and 0 input from the input first order carry $IC_1$, from the preceding MIBAS. The output of super adder 10 will be $S=0$, $C_1=1$, and $C_2=1$. Therefore, the first order output bit position of the MIBA will be equal to 0.

Half adder 14 will have a 1 input from the first order carry $C_1$ of super adder 10 and a 0 input from the second order carry input, $IC_2$ from the previous MIBA section, half adder 14 will have outputs of $S=1$, and $C_1=0$.

Super adder 11 will have six 1's from the input number and a 1 carry from the first order output S of half adder 14. The output of super adder 11 will be $S=1$, $C_1=1$, and $C_2=1$. From this second order output bit position of the MIBA will be equal to a 1.

In order to obtain information as to the carry into super adder 12, super adder 15 must be interrogated. Super adder 15 has a 1 input from the first order carry $C_1$ of super adder 11, a 1 input from the second order carry $C_2$ of super adder 10, a 0 input from half adder 14 and a 0 input from the third order carry input $IC_3$ from the previous MIBA section. The output of super adder 15 will be $S=0$, $C_1=1$, and $C_2=0$.

Super adder 13 will have six 1's from the six binary input binary numbers, and a 0 carry from super adder 15. Super adder 12's output will be $S=0$, $C_1=1$, $C_2=1$. It therefore can be seen that the third order output bit position of the MIBA will be equal to 0.

Again, in order to obtain information of the carry input to super adder 13, super adder 16 must be interrogated. Super adder 16 has a 1 input from the first order carry $C_1$ from super adder 12, a 1 input from the second order carry $C_2$ of super adder 11, a 1 input from the first order carry $C_1$ from super adder 15 and a 0 from the fourth order carry input $IC_4$ from the previous stage. The output of super adder 16 will be $S=1$, $C_1=1$, and $C_2=0$.

Super adder 13 will have six 1's from the six binary input numbers and a 1 from the carry of super adder 16. The output of super adder 13 will be $S=1$, $C_1=1$, and $C_2=1$. Therefore, the fourth order output bit position of the MIBA will be equal to 1.

Super adder 17 determines the first order carry to the next MIBA section. Super adder 17 has as its inputs a 0 from $C_2$ of super adder 15, a 1 from $C_1$ of super adder 16, a 1 from $C_1$ of super adder 13, and a 1 from $C_2$ of super adder 12. The output of super adder 17 will be $S=1$, $C_1=1$, and $C_2=0$. The first order output carry $OC_1$ to MIBAS 40 will therefore be a 1.

Full adder 18 determines the second order carry output $OC_2$ to the MIBAS 40. Full adder 18 has as its inputs a 1 from the second order carry $C_2$ from SA 13, a 1 from the first order carry $C_1$ from SA 17 and a 0 from the second order carry $C_2$ from SA 16. The output of FA 18 will be $S=0$, $C_1=1$. The output second order carry $OC_2$ will be 0 to the MIBAS 40.

HA 19 determines the third order carry output $OC_3$ and the fourth order carry output $OC_4$ to the next MIBAS. The input to HA 19 are a 1 from the first order carry $C_1$ from FA 18 and a 0 from the second order carry $C_2$ from SA 17. The output of HA 19 will be $S=1$, and $C_1=0$. The third order carry output $OC_3$ will be equal to 1 and the fourth order carry output $OC_4$ will be equal to 0 to the next MIBAS 40.

Figure 8:
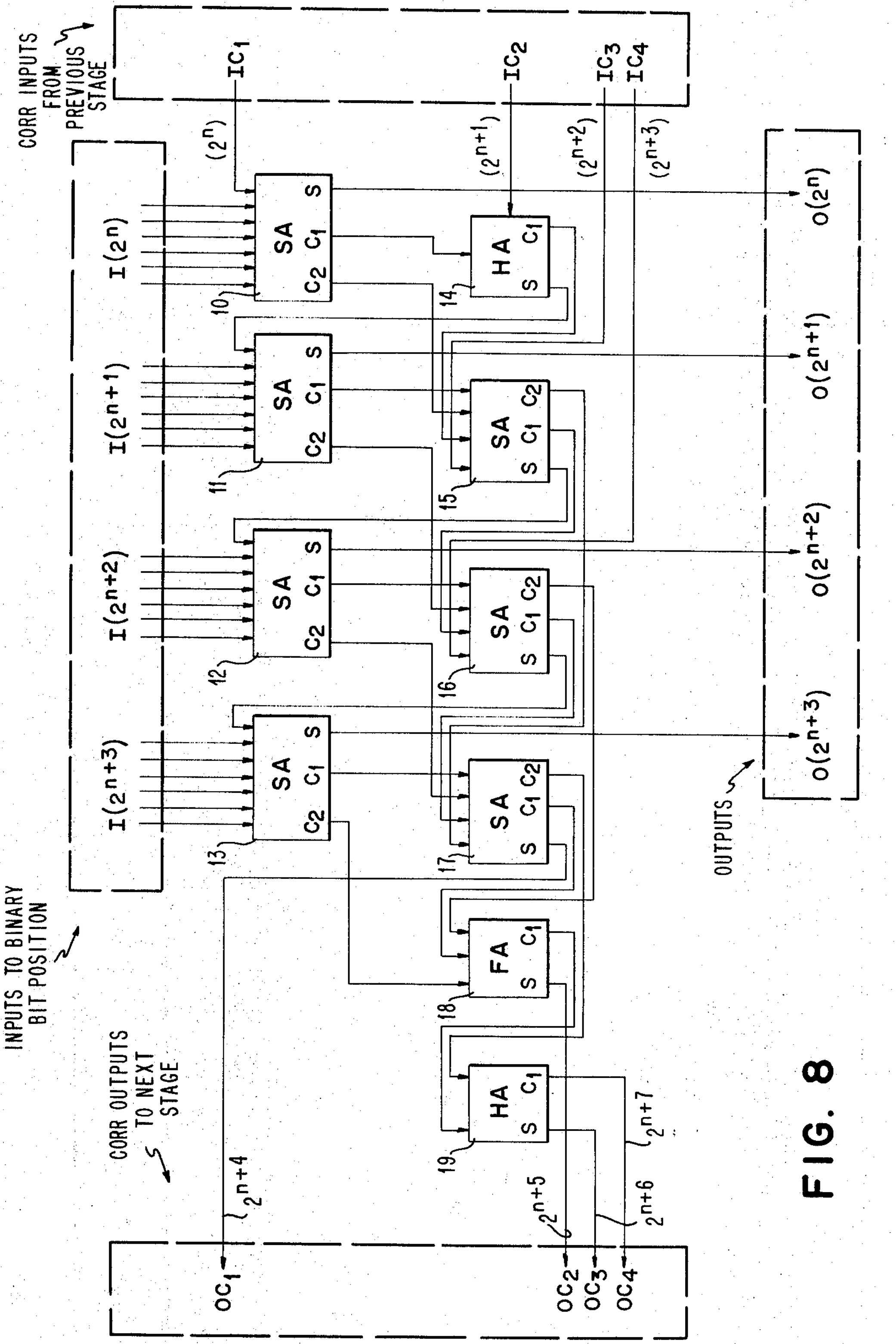
FIG. 8 shows the logic diagram of a four bit multiple input binary adder stage type 2 (MIBAS–2).

Now assume that the circuitry shown in FIG. 8 is contained within multiple input binary adder section 40. SA 10 now adds together the six 1's generated by the fifth order bit of the six binary numbers being added and the 1 generated by the first order carry input $IC_1$ from the multiple input binary adder section 30. The output of SA 10 will be $S=1$, $C=1$, $C_2=1$. The fifth order output bit position of the MIBA will be equal to a 1.

HA 14 having as its input a 1 from the first order carry $C_1$ from SA 10 and a 0 from the second order carry input $IC_2$ from multiple input binary adder stage 30 will have as its output $S=1$ and $C_1=0$.

SA 11 adds the six 1 inputs represented by the sixth order bit of the six eight bit binary input numbers being added and the 1 being input as a carry from HA 14, ST 11 will have output values of $S=1$, $C_1=1$ and $C_2=1$. The sixth order output bit position of the MIBA will be equal to 1.

SA 15 having as its input a 0 from the first order carry $C_1$ from HA 14, a 1 from the third order carry input $IC_3$ from the previous MIBAS, a 1 from the second order carry $C_2$ from super adder 10 and a 1 from first order carry $C_1$ from SA 11 will have as its outputs $S=1$, $C_1=1$, and $C_2=0$.

In a similar manner it can be seen that SA 12 will have seven 1's as its inputs and its outputs will be equal to $S=1$, $C_1=1$, and $C_2=1$. The seventh order input bits position of the MIBA will be a 1.

SA 16 having as its inputs a 1 from the first order carry $C_1$ from SA 15, a 1 from the first order carry $C_1$ from SA 12, a 1 from second order carry $C_2$ from SA 11 and a 0 from the fourth order carry input $IC_4$ from the previous MIBAS will have as its output $S=1$, $C_1=1$, and $C_2=0$.

SA 13 will also have seven 1's as its input and will have an output of $S=1$, $C_1=1$ and $C_2=1$. The eighth order output bit position of the MIBA will be equal to 1.

SA 17 having as its input a 1 from the first order carry $C_1$ from SA 13, a 1 from the second order carry $C_2$ from SA 12, a 1 from first order carry $C_1$ from SA 16 and a 0 from the second order carry $C_2$ from SA 15 will have as its outputs $S=1$, $C_1=1$, and $C_2=0$. The first order output carry $OC_1$ or in this case the ninth order output bit position of the MIBA will be equal to a 1.

FA 18 having as its input a 1 from the second order carry $C_2$ from SA 13, a 1 from the first order carry $C_1$ from SA 17 and a 0 from the second order carry $C_2$ from SA 16 will have as its outputs $S=0$, and $C_1=1$. The second order carry output $OC_2$ or in this case the tenth order output bit position of the MIBA will be equal to a 0.

HA 19 having as its inputs a 1 from the first order carry $C_1$ from FA 18 and a 0 from the second order carry $C_2$ from SA 17 will have as its output $S=1$, and $C_1=0$. The third order carry output $OC_3$ or in this case the eleventh order output bit position of the MIBA will be equal to a 1. In a similar manner the fourth order carry outpunt $OC_4$ or the twelfth order output bit position of the MIBA will be equal to a 0.

To summarize the output number represented by the four output bit positions of the multiple input binary added section 30 and the four output bit positions plus the four carry outputs from the multiple input binary adder section 40 will constitute the output number of the MIBA. In the given example this number will be 010111111010. This is the number that was predicted previously as being the sum of the six eight bit input numbers to the multiple input binary adder.

It therefore can be realized that a multiple input binary adder can be constructed of any bit length by putting in tandem a plurality of multiple input binary adder sections, wherein the output bit positions of each multiple input binary adder section represents the bit position of the output binary number and the carry outputs of the high order multiple input binary adder section will represent the last four high output bit positions of the output binary number of the multiple input binary adder.

An input binary coded decimal adder section which comprises the use of a multiple input binary adder section is another example of the use of this invention. It would appear that since a MIBAS is capable of adding up to six binary numbers, that a binary coded decimal adder that adds six binary coded decimal numbers could be obtained by incorporating the multiple input binary adder section in its construction. The multiple input binary adder sections lend themselves nicely to the construction of a multiple input binary coded decimal adder section since each multiple input binary adder section comprises four binary bits which is the number of binary bits necessary to represent a decimal place in a binary coded decimal number. It can be further realized that by combining a multiple input binary adder section with the proper correction and output circuitry that a multiple input binary coded decimal adder section represents a single decimal place within a binary coded decimal number should be obtained. Therefore, all that is needed to convert a multiple input binary adder section into a multiple input binary coded decimal adder section would be to generate the necessary correction and output logic.

It must be realized that the highest number that can be represented in a given decimal place in a binary coded decimal number is a 9 which when represented in binary form is a 1001. Therefore, the greatest decimal number that can be inputted into a multiple input binary coded decimal adder section will be 6×9 or 54 plus whatever correction factors that may enter through the four carry inputs $IC_1$, $IC_2$, $IC_3$ and $IC_4$.

The greatest carry that can be entered into a multiple input binary coded decimal section can be determined by examining the unit place of a binary coded decimal number. The multiple input binary coded decimal adder section that is used in the unit's place of the binary coded decimal number will have the four input carries equal to zero. The maximum decimal number that has to be represented by the multiple input binary carry decimal adder section will be a decimal 54 or in BCD form a 0101 (X10) 0100 (X1). The term 0100 (X1) will be represented by the four output bit positions of the multiple input binary coded decimal adder section. The 0101 (X10) will be represented by the carry outputs $OC_1$, $OC_2$, $OC_3$, and $OC_4$ from the multiple input binary coded decimal adder section. It can be realized that the decimal value of the carry signal is at most a 50 from the unit place of the BCD number to the tens place of the BCD number. The greatest decimal input number that can be entered into any multiple input binary coded decimal adder section will be a 59, 54 by the 6 BCD numbers to be added and at a most a 5 from the carry inputs $IC_1$, $IC_2$, $IC_3$, and $IC_4$.

Now referring to FIG. 4, which shows the determination of the correction factors needed in the correction and output circuitry to correct the summation of the multiple input binary adder section into binary coded decimal form that is the binary coded decimal representation of the binary output number of the MIBAS. The table shows that the correction factor for a maximum decimal representation of 54 and for 59 are the same. Therefore, the correction circuitry needed for the unit's place of the binary coded decimal number will be the same as for any other decimal place of the binary coded decimal number. It should be here noted that the correction factors that must be implemented will consist of *all* the logic statements up to and including the maximum number to be corrected.

One type of multiple input binary coded decimal adder section can be constructed and used in any decimal place of a multiple input binary coded decimal adder that is composed of a plurality of multiple input binary coded decimal adder sections placed in tandem.

FIG. 4 also shows the equivalent binary coded decimal representation for some sums that might appear as an output of the multiple input binary adder section. Also shown in FIG. 4 is the correction factors necessary for changing the binary number from the multiple input binary adder section to the proper binary coded decimal representation of that number.

FIG. 4 only shows even decimal numbers since a legal even binary coded decimal number cannot become an illegal odd binary coded decimal number by adding a one to the legal even binary coded decimal number. This can be further realized by noting that there is never a need to add a "1" correction factor to the one's position in a decimal place of a binary coded decimal number.

In order to perform a proper correction the procedure normally followed is to interrogate the output of a binary register to determine the proper correction factor to be added to the output of the binary register to obtain a proper binary coded decimal representation. This embodiment follows this concept and therefore it is necessary to interrogate the binary number represented by the four output bit positions and the four carry outputs $OC_1$, $OC_2$, $OC_3$, and $OC_4$ from the multiple input binary adder section to determine the proper correction factor to be added to that same binary number represented by the four output bit positions and the four output carrys $OC_1$, $OC_2$, $OC_3$, and $OC_4$ from the MIBAS.

With reference to FIG. 4, the criteria used to determine if a correction is needed is stated by the logic statements where a dot represents an AND function and a plus an OR function. The $OC_1$ refers to an equivalent first order carry output to the next high order MIBAS. In like manner $OC_2$, $OC_3$ refer to a second order carry output and a third order carry output to the next high order stage.

If the logic expression for a sum 10–19 is satisfied a correction factor of 4 and 2 must be added to the four output bit positions of the multiple input binary adder section. If the logic expression for 20–29 is satisfied, an 8 and 4 must be added to the four output bit positions of the MIBAS. If the logic expression for 30–39 is satisfied, an output first order carry $OC_1$ and a 2 must be added to the four output bit positions and to the four output carrys from MIBAS. If the logic expression for 40–49 is satisfied an output first order carry and an 8 must be added to the four output bit positions and to the four output carrys of MIBAS. If the logic expression for 50–59 is satisfied, then an output first order carry, $OC_1$, an 8, a 4, and a 2 must be added to the four output bit positions and to the four carry outputs of MIBAS.

It is felt that any one skilled in the art can express these logic statements in logic form. Attention is now drawn to FIG. 12 which shows the correction and output circuitry (COC). The circuitry enclosed within area 50 is the expression for determining the correction factors in logic form. No detailed discussion will be given since it is felt that anyone skilled in the art is capable of understanding the basic logic and since there is a multitude of alternate ways of expressing the same logic statement in logic form. The circuitry is shown here only to show one specific means by which the logic statements could be implemented and to provide continuity to the description of the invention.

The correction factors 2, 4, 8 and $OC_1$ are outputted from the correction determining portion 50 of the correction and output controlled circuitry. It is then necessary to add these correction factors to the outputs of the multiple input binary adder section. To this end a functional binary adder is created within the correction and output circuitry. The functional binary adder is comprised of HA 60, FA 62, FA 63, FA 64, FA 65, and OR circuit 66. HA 61 adds the correction factor 2 from OR circuit 51 to the second order output bit position 0(2) of the output binary number from the MIBAS. In like manner, FA 62 adds the correction factor 4 from OR circuit 52, the third order output position bit 0(4) from the MIBAS and the carry signal $C_1$, from the HA 61 to obtain a corrected value for the third order output bit position of the multiple input binary coded decimal adder section. FA 63 adds the correction factor 8 from the OR circuit 53, the fourth output bit position 0(8) from the MIBAS and the carry $C_1$ from the FA 62 to obtain the correct fourth order output bit position of the multiple input binary coded decimal adder section.

It is also necessary to correct the four carry outputs $OC_1$, $OC_2$, $OC_3$, $OC_4$. FA 64 has as its input the first order carry output $OC_1$ signal from the MIBAS, the first order correction output $OC_1$ from OR circuit 54 and the carry signal $C_1$ from full adder 63 to generate the corrected first order correction output $OC_1$. In similar HA 65 adds together the carry $C_1$ from full adder 64 and the second order carry output $OC_2$ from the MIBAS to obtain the corrected second order carry output $OC_2$. Finally, OR circuit 64 OR's together the output third order carry $OC_3$ from the MIBAS and the carry $C_1$ from HA 65 to obtain the corrected third order carry output $OC_3$.

It should be here noted that the fourth order carry output $OC_4$ of the MIBAS is not used since the maximum carry signal is of less magnitude than to necessitate the need for a fourth order carry output to exist. Further, the third order carry output $OC_3$ from MIBAS was only OR'ed with the carry $C_1$ from HA 65 since it is only possible for one of the two situations to exist at any given time. The entire circuitry shown in FIG. 6 represents the circuitry that is included in the correction and output circuitry.

Figure 11:
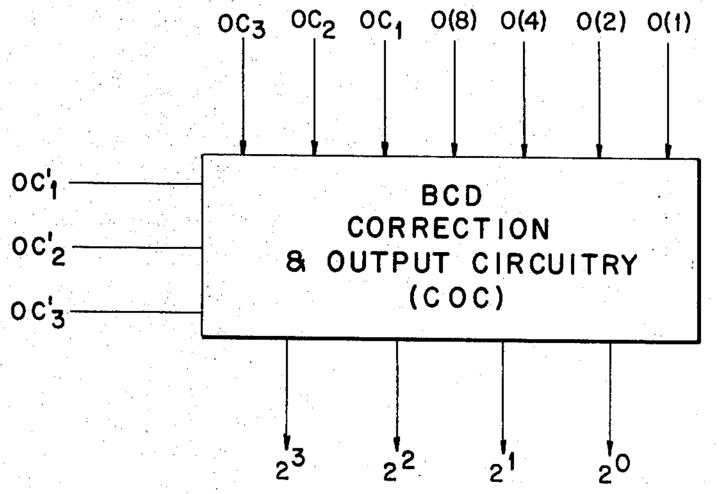
FIG. 11 shows the logic symbol for the correction and output circuitry (COC).

FIG. 11 is a logic block representation of the correction and output circuitry (COC). It can be seen that the 7 inputs to the COC are the 4 output bit positions and 3 of the 4 output carrys of the MIBAS. Further, it can be seen that the correction and output circuitry have three corrective carry outputs $OC'_1$, $OC'_2$, and $OC'_3$ and 4 output bit positions which represent the binary representation of the decimal number for the decimal place that is represented by the multiple input binary coded decimal section.

Again to obtain the greatest understanding of the operation of a multiple input binary coded decimal adder a specific example will again be used. Attention is now drawn to FIG. 13 which represents a two decimal place binary coded decimal adder capable of adding six binary coded decimal numbers (having two decimal places) at the same time. Again assume that the 6 different binary coded decimal numbers have the same value of 1001 (X10) 1001 (X1). The decimal equivalent of this binary coded decimal number is 99. The summation of the six BCD numbers has a value equal to a decimal 594 and a binary coded decimal value of 0101 (X100) 1001 (X10) 0100 (X1).

The multiple input binary coded decimal adder is made up of two MIBCDAS 80 and 90 connected in tandem. Corrected carry outputs $OC'_1$, $OC'_2$, and $OC'_3$ from the correction and output circuitry 92 within multiple input binary coded decimal adder section 90 is connected as input carrys $IC_1$, $IC_2$, and $IC_3$ of multiple input binary adder section 81 of multiple input binary coded decimal adder section 80.

Figure 12:
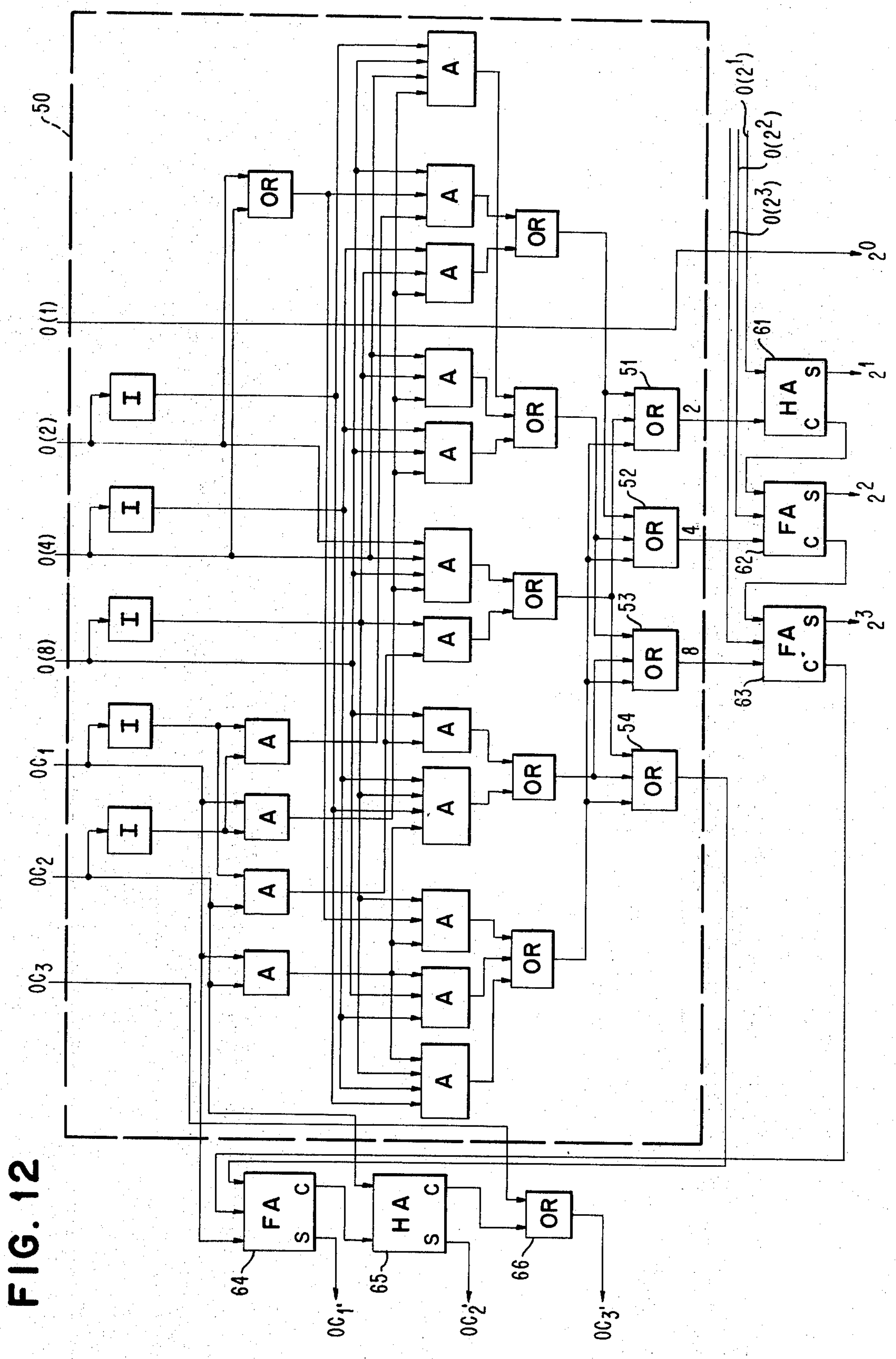
FIG. 12 shows a logic diagram of the correction and output circuitry.

With 6 binary coded decimal numbers each equaling a decimal 9, the summation of the MIBAS 91 of the multiple input binary coded decimal adder section 90 will equal an output value of 54. This output at MIBAS 91 will appear as follows: third order carry output $OC_3=0$, second order carry output $OC_2=1$, first order carry output $OC_1=1$, fourth order output bit position $O(8)=0$, third order output bit $O(4)=1$, second order output bit position $O(2)=1$ and first order output bit position $O(1)=0$. With these given values inputted to the correction and output circuitry 92 of multiple input binary coded decimal adder section 90 a correction factor of a first order carry output $OC_1$, 8, 4, and 2 will be generated and added to the output of the multiple input binary adder stage 91. Referring now to FIG. 12, it can be seen that the first order output bit position O(1) of the MIBAS 91 is connected as the first order output bit position of the binary coded decimal number of the multiple input binary coded decimal adder stage 90. Since the first order output bit position O(1) was equal to a zero then the first order bit of the output BCD number will be equal to a zero.

HA 61 having as its input a 1 generated by the OR circuit 51 in correction circuit 50 and a 1 from the second order output bit position O(2) of the multiple input binary adder stage 91 will have a first order output $S=0$, which will be the second order output bit position of the multiple input binary coded decimal adder stage 90.

The second order output $C_1$ of HA 61 is fed as a carry signal to FA 62. FA 62 having as its other inputs a 1 from the 4 correction OR circuit 52 in correction circuit 50 and a 1 from the third order output bit position O(4) from the multiple input binary adder stage 91 will have as its outputs the low order bit $S=1$, which is the third order output bit position of the multiple input binary coded decimal adder section 90. Adder 62 second order output $C_1$ is fed as a carry signal to FA 63. FA 63's other inputs being a 1 from correction OR circuit 53 in correction circuit 50 and a 0 from the fourth order output bit position from MIBAS 91 will have a first order output $S=0$, which will be the fourth order output bit position of the multiple input binary coded decimal adder section 90.

FA 64 will have as its inputs a 1 from the first order carry output $OC_1$ from the multiple input binary adder section 91, a 1 from the first order carry output $OC_1$, correction from OR circuit 54 in correction circuitry 50 and a 1 from the first order carry $C_1$ from FA 63. FA 64 will have a first order output $S=1$, which is a corrected first order carry output $OC'_1$. FA 64 will have a second order output C which will be fed to HA 65 as a carry signal. The other input to HA 65 is equal to a 1 from the second order carry output $OC_2$ from the multiple input binary adder stage 91. HA 65 has a first order output $S=0$, which will make the corrected second order carry output $OC'_2$ equal to 0. The second order carry $C_1$ from HA 65 is equal to a 1 and will pass through OR circuit 66 and appear as a corrected third order output $OC'_3$ equal to a 1.

Figure 13:
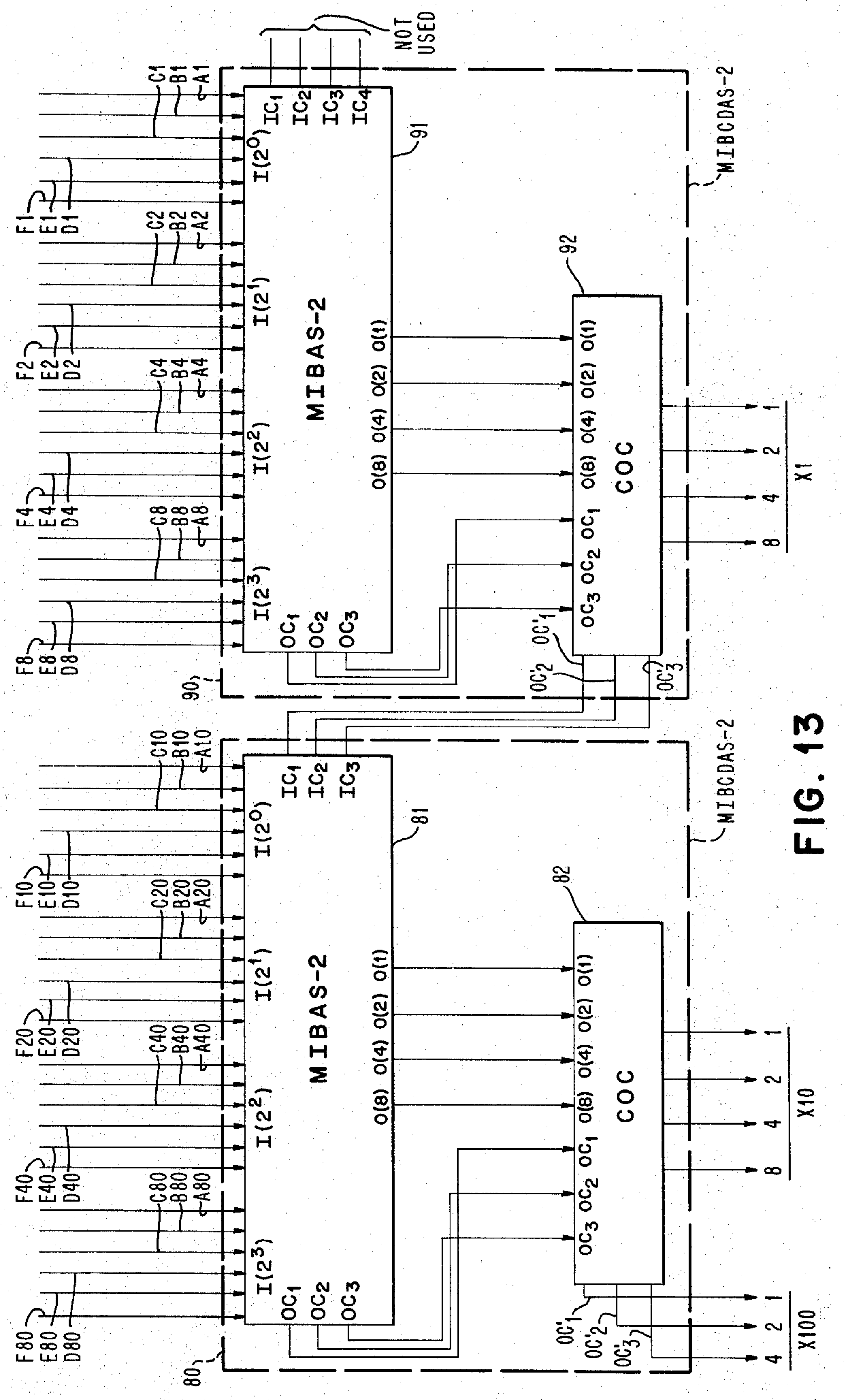
FIG. 13 shows a two decimal place binary coded decimal adder which is comprised of two multiple input binary adder stages with their associated correction and output circuitry.

Referring to FIG. 13, the input to the multiple input binary adder section 81 of the multiple input binary coded decimal adder section 80 will have inputs equaling 54 from the 8 binary coded decimal numbers and a 5 from the carry inputs which will total to a decimal value of 59. The output of multiple input binary adder stage 81 will be third order carry output $OC_3=0$, second order carry output $OC_2=1$, first order carry output $OC_1=1$, fourth order output bit position $O(8)=1$, output third order bit position $O(4)=0$, output second order bit position $O(2)=1$, and output first order bit position $O(1)=1$. With these inputs into correction and output circuitry 82 in multiple input binary coded decimal adder section 80, will cause correction circuitry 50 in correction and output circuitry 82 to generate a correction factor; first order carry output $OC_1$, an 8, a 4, and a 2.

Again referring to FIG. 12, it can be seen that the output first order bit position O(1) from the multiple input binary adder stage 81 is connected as the first order bit of the BCD output number and will be equal to a 1. Once again these correction factors generated by correction circuitry 50 in correction output circuitry 82 will have to be added to the binary output of the multiple input binary adder stage 81.

HA 61 has as its inputs a 1 from the 2 correction factor from OR circuit 51 and a 1 from the output second order bit position O(2) which will cause HA 61 to have a low order output $S=0$, which is the second order output bit position of the multiple input binary code decimal adder section 80. The high order output C of HA 61 is equal to a one and is connected into FA 62 as a carry signal. FA 62 having as its other inputs a 1 from the 4 correction OR circuit 52 in correction circuitry 50 and a 0 from the output third order bit O(4) from the multiple input binary adder stage 81 will have a low order output $S=0$ which is the third order output bit position of the multiple input binary code decimal adder section 80. The high order bit C from FA 62 is equal to a 1 and is connected to FA 63 as a carry signal. FA 63 having as its other input a 1 from the 8 correction factor from OR circuit 53 in correction circuitry 50 and a 1 from the output fourth order bit O(8) from the multiple input binary adder section 81 will have a low order output bit $S=1$, which is the output fourth order bit position of the multiple input binary coded decimal adder section 80. The carry signal C from FA 63 is equal to a 1 and is entered into FA 64 as a carry signal. FA 64 having its other inputs equal to a 1 from the first order carry output $OC_1$ from the multiple input binary adder section 81 and a 1 from the first order carry output $OC_1$ from OR circuit 54 will have a low order output $S=1$. This low order output bit would normally appear as a corrected first order carry output $OC'_1$ but since this is the high order stage of the multiple input binary coded decimal adder, the corrected first order carry output $OC'_1$ will become the output first order bit position of the highest decimal place in the binary coded decimal answer which in this case will be equal to a 1.

The high order output C of FA 64 is also equal to a 1 and is connected into HA 65 as a carry signal. HA 65 other input is equal to a 1 from the second order carry output $OC_2$ from the multiple input binary adder section 81 and this will cause HA 65 low order bit S to be equal to a zero. Here again the low order bit S normally is interpreted as the corrected second order carry output $OC_2$. However, this being the highest order stage it will appear as the output second order bit position of the highest decimal place in the binary coded decimal number and will be equal to a zero.

The high order output C of HA 65 is equal to a 1 and causes the corrected third order carry output $OC'_3$ to equal 1. Here once again third order carry output $OC'_3$ being generated by the last multiple input binary coded decimal adder section will act as the output third order bit position of the highest decimal place in the binary coded decimal number which in this case is a 1.

To summarize, the output binary coded decimal number is 0101 (X100) 1001 (X10) 0100 (X1). This was the BCD number that was predicted and should be found if in fact the multiple input binary coded decimal adder did add the six binary coded decimal numbers simultaneously. It can therefore be realized that a multiple input binary coded decimal adder of any length can be obtained by placing in tandem a plurality of multiple input binary coded digital adder sections, each of which is comprised by a multiple input binary adder section and a correction and output circuitry.

The MIBCDA has the additional capability of converting a binary number into its binary coded decimal form directly. This can be accomplished by realizing that all inputs to the MIBCDA can be used and the correction circuitry in the COC can be expanded to include the necessary correction factors shown in FIG. 4.

Normally a designer does not know what the values of the BCD numbers to be inputs to the MIBCDA and therefore one input in each position of each decimal place must be reserved for each given input. It can be realized that if one knows what BCD number could be inputted then only those BCD components in the MIBCDA comprising each BCD number need be reserved.

Further, it should be realized that the carry inputs into the MIBCDAS for the unit place of the MIBCDA can be used, thus effectively allowing seven inputs to each of the four super adders associated with the four bit positions.

Referring to FIG. 14, it can be seen that each power of 2 has an equivalent binary coded decimal number. Therefore, a binary to binary coded decimal converter can be obtained by simply connecting each given power of 2 represented by a given bit position in a binary storage register to the MIBCDA as a set of BCD components.

For example, the sixth power of 2 ($2^6$) has BCD components of a 40, a 20 and a 4. The line representing $2^6$ would be connected to the second order and third order inputs $I(2^{n+1})$ and $I(2^{n+2})$ of the MIBCDAS for the ten place in the MIBCDA and to the third order input $I(2^{n+2})$ of the MIBCDAS for the units place in the MIBCDA.

It therefore can be realized that a binary number having up to 16 bit positions can be converted by the use of a MIBCDA consisting of 5 MIBCDAS in tandem.

While the invention has been particularly shown and described with reference to preferred embodiments thereof, it would be understood by those skilled in the art that various changes in form and detail may be made therein without departing from the spirit and scope of the invention.

What is claimed is:

1. A multiple input binary adder for adding a plurality of *n* bit position binary numbers comprising:

a super adder for each of said *n* bit positions for adding said plurality of binary input numbers, said super adder having a first order output which represents the output sum for that position of said *n* bit positions associated with said super adder and each super adder having a plurality of high order outputs greater than said first order output that represents different order carrys;

a carry determining means for generating the necessary carry input to said super adder for each of said *n* bit positions;

a first connecting means for connecting said order carry outputs of said super adder for each of said *n* bit positions to said carry determining means.

2. A multiple input binary adder section as set forth in claim 1 wherein said carry determining means comprises super adders.

3. A type two multiple input binary adder section having four bit positions for simultaneously adding a plurality of binary inputs to each of said four bit positions together with a plurality of order carry inputs from the preceding type two multiple input binary adder stage comprising:

four super adders, each of said four super adders representing a bit position of said four bit positions, each of said super adders having a first order output which represent the output sum for that bit position of said four bit positions associated with said super adder, and each super adder having a plurality of high order outputs greater than said first order output that represent different order carrys;

a carry determining means for generating the necessary carry input to each of said four super adders and to generate the necessary order carry outputs to the next type two multiple input binary adder section from said high order outputs from said four super adders and from said order carry inputs from the preceeding type two multiple input binary adder section;

a first connecting means for connecting said high order outputs from said four super adders and said order carry inputs from said previous type two multiple input binary adder section to said carry determining means.

4. A multiple input binary adder for simultaneously adding a plurality of *n* position binary numbers comprising:

a plurality of type two multiple input binary adder sections placed in tandem to each other, where the order carry outputs of a given type two multiple input binary adder section of said plurality of type two multiple input binary adder sections is connected as an order carry input to the next type two multiple input binary adder section of said plurality of type two multiple input binary adder sections;

the type two multiple input binary adder section of said plurality of type two multiple input binary adder sections which represent the highest four order bit positions of said *n* bit positions of said plurality of input numbers having said order carry outputs equal to the high order output bit position of the summation of the plurality of *n* bit binary numbers of said multiple input binary adder.

5. A type two multiple input binary coded decimal adder section for simultaneously adding a single decimal place of a plurality of binary coded decimal numbers comprising:

a type two multiple input binary adder section for adding said plurality of binary coded decimal numbers together with a plurality of corrected order carry inputs from a previous type two multiple input binary coded decimal adder section for producing a plurality of order carry outputs and four bit positions;

correction and output circuitry connected to and converting the binary number represented by the plurality of order carry outputs and four output bit positions of said type two multiple input binary adder section into a four bit binary coded decimal number and a plurality of corrected order carry outputs.

6. A multiple input binary coded decimal adder for adding a plurality of *n* decimal of *n* decimal place binary coded decimal numbers comprising:

a plurality of type two multiple input binary coded decimal adder sections placed in tandem, where the corrected order carry outputs of each type two multiple input binary coded decimal adder section are connected as corrected order carry inputs to the next type two multiple input binary coded decimal adder section; and the connected order carry outputs of the one of said type two multiple input binary coded decimal adder section associated with the highest decimal place of said *n* decimal places of said plurality of binary coded decimal numbers being equal to the highest decimal place of the summation of the multiple input binary coded decimal numbers added.

References Cited

UNITED STATES PATENTS

| | | | |
|---|---|---|---|
| 2,941,720 | 6/1960 | Marshall et al. | 235—164 |
| 2,888,202 | 5/1959 | Blakenbaker et al. | 235—176 |
| 2,907,526 | 10/1959 | Havens | 235—174 |
| 2,923,474 | 2/1960 | Blakenbaker | 235—170 |
| 3,267,268 | 8/1966 | Sanborn | 235—175 |

OTHER REFERENCES

"High-Speed, Self-Checked, BCD Adder," M. Y. Hsiao, IBM Technical Disclosure Bulletin, vol. 4, No. 12, May 1962, pp. 59–61.

EUGENE G. BOTZ, Primary Examiner

J. F. GOTTMAN, Assistant Examiner

U.S. Cl. X.R.

235—175

PO-1050
(5/69)

UNITED STATES PATENT OFFICE
CERTIFICATE OF CORRECTION

Patent No. 3,535,502 Dated October 20, 1970

Inventor(s) G. L. CLAPPER

It is certified that error appears in the above-identified patent and that said Letters Patent are hereby corrected as shown below:

Column 9, line 57 "FIG 2" should read --FIG 8--.

Column 12, line 21 "13" should read --12--.

Column 20, line 28 Claim 6 delete "of n decimal" second occurrence.

Signed and sealed this 13th day of April 1971.

(SEAL)
Attest:

EDWARD M.FLETCHER,JR.
Attesting Officer

WILLIAM E. SCHUYLER, JR.
Commissioner of Patents